US011107272B2

(12) United States Patent
Chen et al.

(10) Patent No.: US 11,107,272 B2
(45) Date of Patent: Aug. 31, 2021

(54) SCALABLE VOLUMETRIC 3D RECONSTRUCTION

(71) Applicant: Microsoft Technology Licensing, LLC, Redmond, WA (US)

(72) Inventors: Jiawen Chen, Cambridge (GB); Dennis Bautembach, Cambridge (GB); Shahram Izadi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/774,534

(22) Filed: Jan. 28, 2020

(65) Prior Publication Data

US 2020/0160597 A1 May 21, 2020

Related U.S. Application Data

(63) Continuation of application No. 13/916,477, filed on Jun. 12, 2013, now abandoned.

(51) Int. Cl.
*G06G 7/48* (2006.01)
*G06T 17/00* (2006.01)

(52) U.S. Cl.
CPC ........ *G06T 17/005* (2013.01); *G06T 2200/08* (2013.01)

(58) Field of Classification Search
CPC ......... G06T 2207/10028; G06T 17/005; G06T 2207/20221; G06T 2207/30244; G06T 9/40; G06T 17/00; G06T 15/08; G06T 7/50; G06T 7/70
See application file for complete search history.

(56) References Cited

U.S. PATENT DOCUMENTS

2003/0052878 A1* 3/2003 Han ............... G06T 15/205
345/420
2003/0214502 A1* 11/2003 Park ............... G06T 17/005
345/420

(Continued)

OTHER PUBLICATIONS

Zeng et al. Octree-Based Fusion for Realtime 3D Reconstruction Graphical Models, Nov. 2012 (Year: 2012).*

(Continued)

*Primary Examiner* — Rehana Perveen
*Assistant Examiner* — Cuong V Luu
(74) *Attorney, Agent, or Firm* — Merchant & Gould P.C.

(57) ABSTRACT

Scalable volumetric reconstruction is described whereby data from a mobile environment capture device is used to form a 3D model of a real-world environment. In various examples, a hierarchical structure is used to store the 3D model where the structure comprises a root level node, a plurality of interior level nodes and a plurality of leaf nodes, each of the nodes having an associated voxel grid representing a portion of the real world environment, the voxel grids being of finer resolution at the leaf nodes than at the root node. In various examples, parallel processing is used to enable captured data to be integrated into the 3D model and/or to enable images to be rendered from the 3D model. In an example, metadata is computed and stored in the hierarchical structure and used to enable space skipping and/or pruning of the hierarchical structure.

20 Claims, 18 Drawing Sheets

(56) References Cited

U.S. PATENT DOCUMENTS

| | | | |
|---|---|---|---|
| 2004/0150639 A1* | 8/2004 | Park | G06T 9/40 345/419 |
| 2005/0180340 A1* | 8/2005 | Lee | G06T 9/40 370/258 |
| 2014/0324204 A1* | 10/2014 | Vidimce | B29C 64/386 700/98 |

OTHER PUBLICATIONS

Beyer et al. Smooth Mixed-Resolution GPU Volume Rendering IEEE/EG Symposium on vol. and Point-Based Graphics (Year: 2008).*

Nilo Stolte Visualizing Remotely Sense Depth Maps Using Voxels Springer-Verlag Berlin—Heidelberg 1999 (Year: 1999).*

* cited by examiner

SCALABLE VOLUMETRIC 3D RECONSTRUCTION

CROSS-REFERENCE TO RELATED APPLICATIONS

This application is a continuation of U.S. application Ser. No. 13/916,477, filed Jun. 12, 2013 and titled "SCALABLE VOLUMETRIC 3D RECONSTRUCTION," the disclosure of which is hereby incorporated herein by reference.

BACKGROUND

Three dimensional reconstruction of surfaces in the environment is used for many tasks such as robotics, engineering prototyping, immersive gaming, augmented reality and others. For example, a moving capture device may capture images and data as it moves about in an environment; the captured information may be used to automatically compute a volumetric model of the environment such as a living room or an office. In other examples the capture device may be static whilst one or more objects move in relation to it. Existing systems for computing volumetric 3D reconstructions of environments and/or objects are typically limited in the size of the real world volume they are able to reconstruct. For example, due to memory and processing capacity constraints and, for many applications, the desire to operate in real time.

The embodiments described below are not limited to implementations which solve any or all of the disadvantages of known systems for computing volumetric 3D reconstructions of environments and/or objects.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Scalable volumetric reconstruction is described whereby data from a mobile environment capture device is used to form a 3D model of a real-world environment. In various examples, a hierarchical structure is used to store the 3D model where the structure comprises a root level node, a plurality of interior level nodes and a plurality of leaf nodes, each of the nodes having an associated voxel grid representing a portion of the real world environment, the voxel grids being of finer resolution at the leaf nodes than at the root node. In various examples, parallel processing is used to enable captured data to be integrated into the 3D model and/or to enable images to be rendered from the 3D model. In an example, metadata is computed and stored in the hierarchical structure and used to enable space skipping and/or pruning of the hierarchical structure.

In some examples the 3D model of the real-world environment is stored, either as a regular grid or using a hierarchical structure, and data of the 3D model is streamed between at least one parallel processing unit and one or more host computing devices.

In some examples a plurality of parallel processing units are used, each having a memory storing at least part of the 3D model. For example, each parallel processing unit uses the same amount of memory mapped to different physical dimensions in the real-world environment.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computing device having one or more graphics processing units, the system described is provided as an example and not a limitation. As those skilled in the art will appreciate, the present examples are suitable for application in a variety of different types of computing devices having parallel computing ability.

Figure 1:
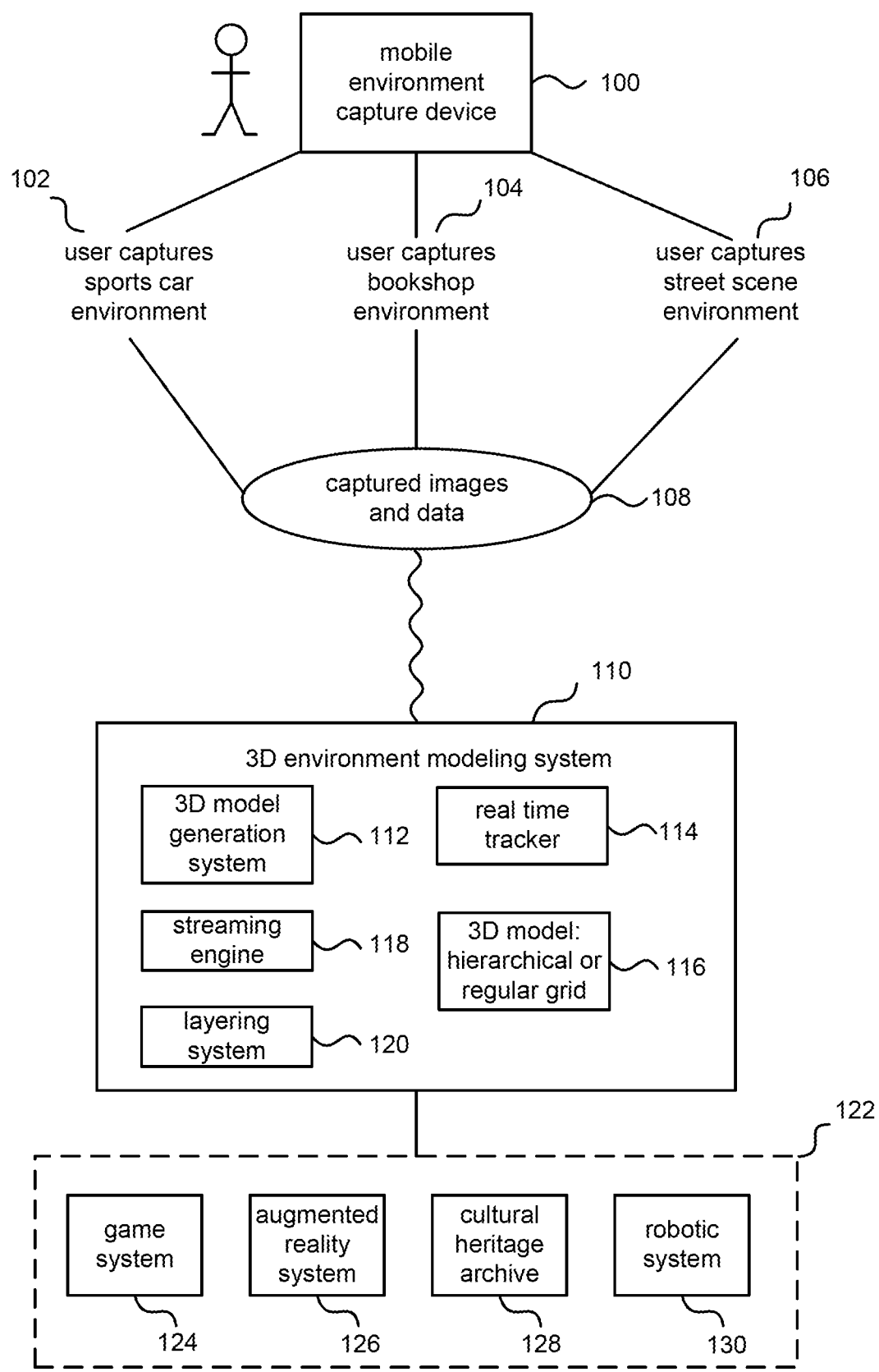
FIG. 1 is a schematic diagram of a 3D environment modeling system for use with a mobile environment capture device.

FIG. 1 is a schematic diagram of a 3D environment modeling system 110 for use with a mobile environment capture device 100. Using the captured images and data 108 the 3D environment modeling system 110 is able to construct a detailed model 116 of 3D surfaces in its environment. For example the model may store enough information so that it may be used to depict exterior surfaces of a sports car showing curves, indentations, relief work, wing mirrors, handles and detailed surfaces of the sports car engine (when the bonnet is open), its dashboard and interior. In another example, the surfaces may be floors, walls, bookshelves, staircases, light fittings, furniture and other objects inside a bookshop. In another example the surfaces may be of shop fronts, lamp posts, tree foliage and other objects on a street. The level of detail may be such that individual keys of a keyboard may be discriminated where a keyboard is in the environment being captured. Finer levels of detail may also be possible. The model captures how the surfaces are positioned in the real world, so that it is possible to use the model to navigate in the environment for example, or to project virtual reality objects into the environment in a manner which takes into account the real environment. The model may be imported into other systems, such as games or computer aided design systems, to enable the model to be used. For example, to generate an entity in a computer game, such as a sports car or to facilitate prototyping of sports car designs.

In the example illustrated in FIG. 1 a user operates the mobile environment capture device 100 which is handheld whilst moving in an environment such as any of: a space occupied by a sports car, a bookshop and a street. These are examples only; the mobile environment capture device 100 may be operated, by a human or an automated system, in any environment in which its capture devices will operate effectively. Images and optionally other captured data 108 are transferred from the mobile environment capture device 100 to a 3D environment modeling system 110. For example, by wired or wireless connection. In other examples the capture device 100 and the 3D environment modeling system are integral. The 3D environment modeling system 110 is computer implemented using one or more parallel computing units and at least one host computing device. It comprises a 3D model generation system 112 for generating a 3D model 116 of the environment and/or objects. It comprises a real time tracker 114 for tracking a position and orientation (referred to as pose) of the mobile environment capture device 100. In some examples it comprises a streaming engine 118 for streaming at least part of the 3D model 116 between one or more parallel computing units and a host computing device. In some examples it comprises a layering system 120 for enabling the "viewing distance" to be increased; that is to enable a greater depth range from the mobile environment capture device to be represented. This is useful where depth cameras with greater range are available.

As mentioned above, the 3D model 116 generated by the 3D environment modeling system 110 may be exported to a game system 124. That is, the 3D model 116 and other data such as the camera pose from the real time tracker 114, the captured images and data 108 and other data may be input to a downstream system 122 for ongoing processing. Examples of downstream systems 122 include but are not limited to: game system 124, augmented reality system 126, cultural heritage archive 128, robotic system 130. A cultural heritage archive may store 3D models of objects and/or environments for record preservation and study.

The mobile environment capture device 100 comprises a depth camera which is arranged to capture sequences of depth images of a scene. Each depth image (or depth map frame) comprises a two dimensional image in which each image element (such as a pixel or group of pixels) comprises a depth value such as a length or distance from the camera to an object in the captured scene which gave rise to that image element. This depth value may be an absolute value provided in specified units of measurement such as meters, or centimeters or may be a relative depth value. In each captured depth image there may be around 300,000 or more image elements each having a depth value. The frame rate of the depth camera is high enough to enable the depth images to be used for working robotics, computer game or other applications. For example, the frame rate may be in the range of 20 to 100 frames per second.

The depth information may be obtained using any suitable technique including, but not limited to, time of flight, structured light, and stereo images. The mobile environment capture device 100 may also comprise an emitter arranged to illuminate the scene in such a manner that depth information may be ascertained by the depth camera.

The mobile environment capture device 100 also comprises one or more processors, a memory and a communications infrastructure. It may be provided in a housing which is shaped and sized to be hand held by a user or worn by a user. In other examples the mobile environment capture device is sized and shaped to be incorporated or mounted on a vehicle, toy or other movable apparatus. The mobile environment capture device 100 may have a display device. For example, to display images rendered from the 3D model in order to enable a user to tell which areas of an environment are yet to be visited to capture data for the 3D model.

Figure 2:
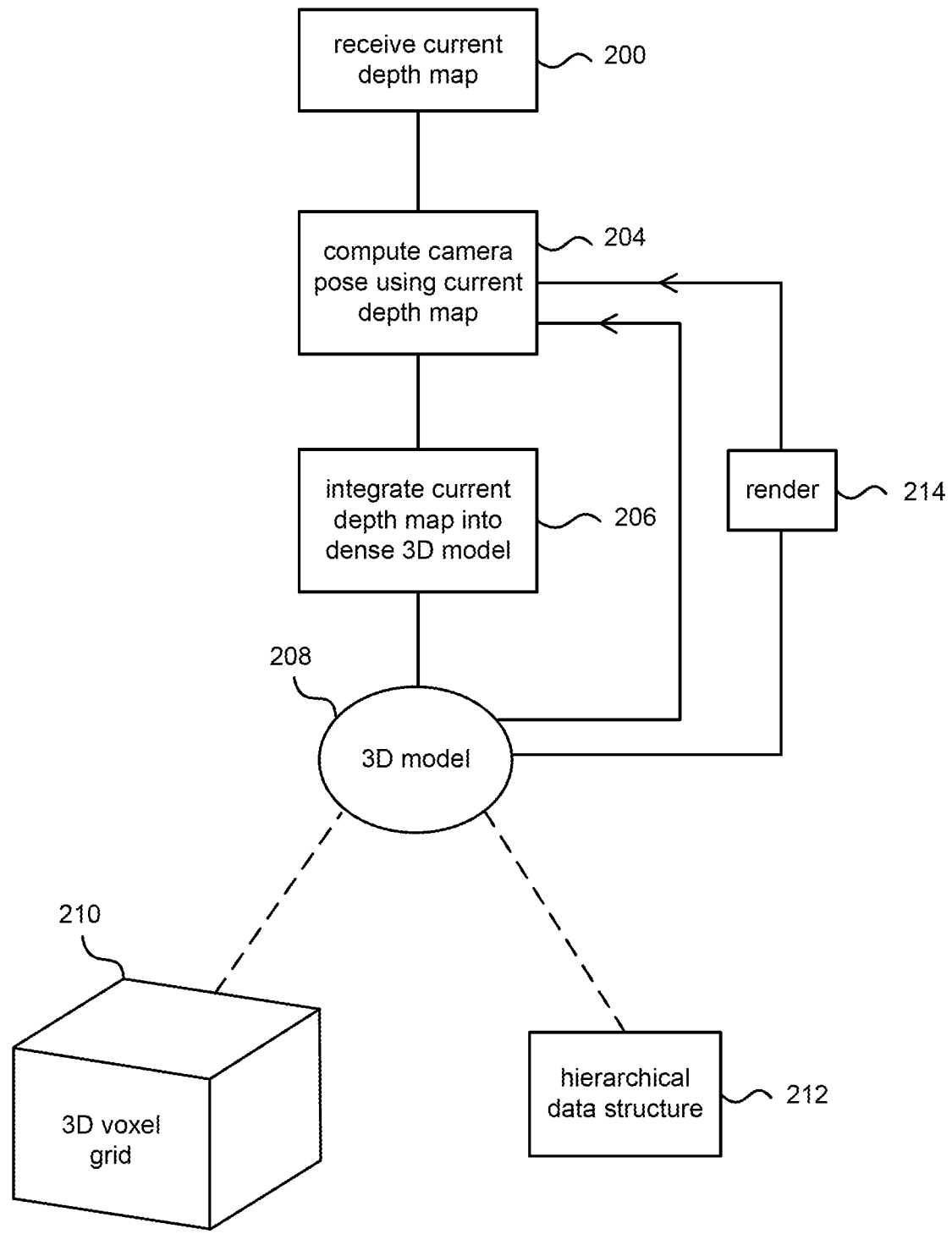
FIG. 2 is a flow diagram of a method at the 3D environment modeling system of FIG. 1.

FIG. 2 is a flow diagram of a method at the 3D environment modeling system of FIG. 1 for integrating depth maps, from a stream of depth maps captured by the mobile environment capture device, into a dense 3D model of the environment surfaces. In this way a dense 3D model of the environment surfaces is gradually built up as more depth maps are received from different camera viewpoints. The term "integration" is used here to refer to fusing or aggregating data from a current depth map into the dense 3D model.

The mobile environment capture device computes 204 the current pose of the mobile capture device using real time tracker 114. For example, the current pose may be computed using an iterative closest point process that takes as input the current depth map and a corresponding depth map rendered 214 from the current 3D model 208 of the environment. Examples of this type of method are described in detail in US patent publication 20120196679 entitled "Real-Time Camera Tracking Using Depth Maps" Newcombe et al. filed on 31 Jan. 2011 and published on 2 Aug. 2012. It is also possible for the current pose to be computed using a process where depth observations from a mobile depth camera are aligned with surfaces of a 3D model of the environment in order to find an updated position and orientation of the mobile depth camera which facilitates the alignment. Examples of this type of method are described in U.S. patent application Ser. No. 13/749,497 entitled "Camera pose estimation for 3D reconstruction" Sharp et al. which was filed on 24 Jan. 2013. It is also possible to compute 204 the camera pose using other data. For example the mobile environment capture device 100 may have sensors to track its pose such as a global positioning system, a compass, an accelerometer or other similar sensors to enable pose to be tracked. Combinations of one or more of these or other ways of computing the camera pose may be used.

The camera pose from the real time tracker may be in the form of a six degree of freedom (6DOF) pose estimate which indicates the location and orientation of the depth camera. In one example, the 6DOF pose estimate can be in the form of an $SE_3$ matrix describing the rotation and translation of the depth camera relative to real-world coordinates. More formally, this transformation matrix can be expressed as:

$$T_k = \begin{bmatrix} R_k & t_k \\ 0^\top & 1 \end{bmatrix} \in SE_3$$

Where $T_k$ is the transformation matrix for depth image frame k, $R_k$ is the camera rotation for frame k, $t_k$ is the camera translation at frame k, and Euclidean group $SE_3$: ={R, t|R $\in SO_3$, t $\in R^3$}. Coordinates in the camera space (i.e. from the camera perspective) can be mapped to real-world coordinates by multiplying by this transformation matrix, and vice-versa by applying the inverse transform.

The 3D environment modeling system integrates 206 the current depth map 200 into a dense 3D model of surfaces in the environment. This process may begin with an empty 3D model which is gradually filled by aggregating information from captured depth map frames. This may be achieved as described in US patent publication 20120194516 entitled "Three-dimensional environment reconstruction" Newcombe et al. filed on 31 Jan. 2011 and published on 2 Aug. 2012.

The resulting 3D model may be stored in a volume of memory at a parallel processing unit, for example, as a 3D voxel grid 210, where each voxel stores a numerical value which is a truncated signed distance function value. This is described in US patent publication 20120194516 referenced above and will be referred to herein as storing the 3D model as a regular grid. Where the 3D voxel grid 210 stores a truncated signed distance function value at each voxel the capacity of the parallel processing unit main memory of the 3D environment modeling system limits the volume of real world space that may be represented.

The 3D voxel grid 210 can be visualized as a cuboid of memory, wherein each memory location is a voxel representing a point in space of the environment being modeled. Therefore the 3D grid directly represents a spatial portion of the real-world environment. As the 3D volume corresponds directly to a real-world volume, the size of the real-world volume represented in a fixed-size memory determines the model resolution. For example, if a large real-world volume is to be modeled, then each voxel of the memory represents a larger region in real-world space, and hence the resolution is lower than if a smaller real-world volume is modeled. If more memory is available, however, the large real-world volume can be modeled at a higher resolution.

In various embodiments, a hierarchical data structure 212 is used to store at least part of the 3D model 208 to enable much larger volumes of real world space to be reconstructed at the same level of detail, using reduced memory capacity at a parallel processing unit, and enabling real time operation. New processes for creating, filling, storing and using examples of hierarchical data structures in real time are described below with reference to FIGS. 3 to 10. In these examples the hierarchical data structure achieves loss-less compression as compared with the regular grid 210 by using coarser nodes to represent free space in the world and finer nodes to represent the signed distance function near surfaces. This takes into account the fact that, typically, the vast majority of the environment is empty so that in a regular grid 210 most of the signed distance function is marked as free space.

Many different types of hierarchical data structure may be used such as pyramids or trees. For example, hierarchical data structures comprising trees which use spatial subdivision may be used as these enable a signed distance function representing the 3D modeled surface to be stored and updated as new depth maps arrive, without the need to completely rebuild the hierarchical data structure as each depth map is taken into account. A tree data structure comprises a root node, one or more levels of interior or split nodes and a plurality of leaf nodes. Branches connect the root node to first level interior nodes and connect interior level nodes to the next level of the tree until the terminal nodes, called leaf nodes, are reached. Data may be stored in the tree structure by associating it with one or more of the nodes.

Hierarchical data structures with spatial subdivision comprise one or more trees where branches of the trees divide real world space represented by the 3D model. Many different spatial subdivision strategies are possible. Regular spatial subdivision strategies may be used rather than anisotropic ones, because the camera pose is continually updated. Regular spatial subdivision enables no assumptions about which way the user will move to be made. For example, although an anistropic grid may be well adapted for the camera when it is facing one direction, once the user turns (for example, 90 degrees left), the grid of the 3D model is no longer aligned and poor sampling results.

Hierarchical data structures formed with regular spatial subdivision may be built with any of a variety of different refinement strategies. A refinement strategy comprises rules and/or criteria for deciding when to create branches from a node. With no refinement a dense regular grid is generated as shown at 210 in FIG. 2 which scales as $O(n^3)$ in storage where n is the resolution of one side of the grid. With full dyadic refinement (i.e. a binary split along each axis giving 8 children for each node) and data stored at the leaves a complete octree is formed. This gives a very deep hierarchy that may be complex to update and traverse using a parallel processing unit such as a graphics processing unit. It is also possible to use different branching factors at each level of each tree which is known as an $N^3$ tree structure. Another option is to use adaptive refinement whereby the signed distance function is represented at multiple resolutions by storing the value at different levels of the tree and splitting a node when it can no longer summarize the variation within.

Empirical investigation of different hierarchical data structures found that trees with regular spatial subdivision, such as $N^3$ trees without adaptive refinement give a good memory/performance trade-off. This type of hierarchical data structure is now described with reference to FIG. 3.

A 3D grid 300 similar to the 3D voxel grid 210 of FIG. 2 stores, instead of a truncated signed distance function value at each voxel as in FIG. 2, a record with an address of its child (if it has one) and, in some examples, information about subtrees of that voxel in the hierarchical data structure. The record is stored with much less memory than a truncated signed distance function value is stored with. In this way the regular 3D grid 300 takes less memory than the 3D voxel grid 210 of FIG. 2.

Figure 3:
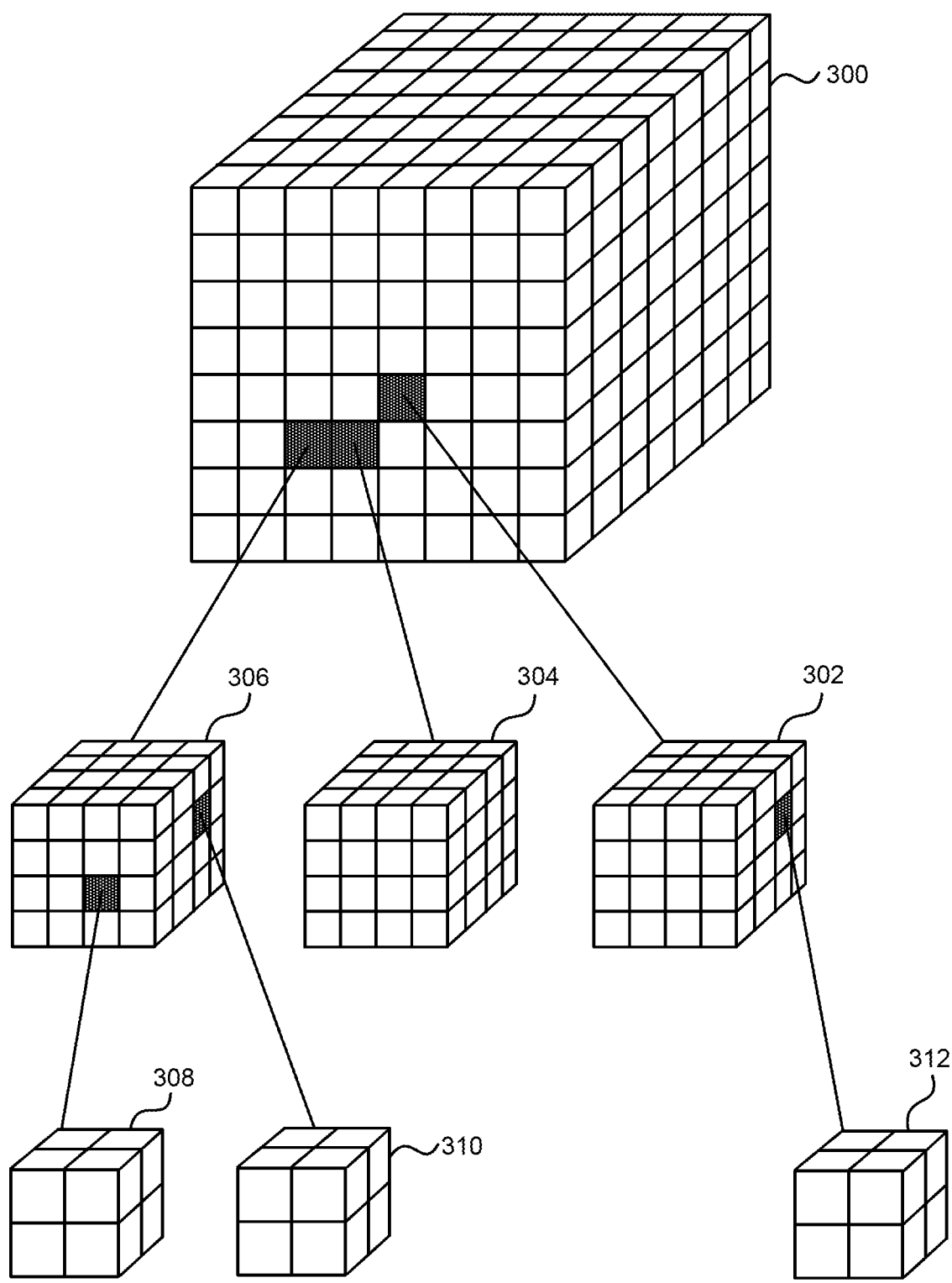
FIG. 3 is a schematic diagram of a hierarchical data structure for storing a 3D model generated using the 3D environment modeling system of FIG. 1.

A subset of the voxels of the 3D grid 300 are near the surface of the signed distance function as reconstructed so far. Each of the voxels in this subset becomes a root node of a tree. In FIG. 3 three such voxels are shown for clarity although in practice many more such voxels may be present. The way in which the subset of the voxels is selected is referred to as a refinement strategy for deciding which of the voxels in the grid will have a child node. In the example in FIG. 3 three voxels of the root level have a child node and each of these child nodes is shown as a cube with half as many voxels along each edge as for the root level grid as regular spatial subdivision is used. These level one nodes (also referred to as level one grids) 302, 304, 306 store, at each voxel, a record with an address of its child (if it has one) and, in some examples, information about sub-trees of that voxel in the hierarchical data structure. Each level one grid represents the same real world volume as one root level voxel, but at a finer resolution.

In the example of FIG. 3 the hierarchical data structure has three levels so that the second level nodes 308, 310, 312 are leaf nodes. However, it is also possible to use hierarchical data structures with two or more levels. A refinement strategy is used to select which of the level one voxels will have a child node. The refinement strategy may be the same as the refinement strategy used at the previous level. Regular spatial subdivision is used and so each leaf node stores a 3D grid with a resolution specified by the user. In the example shown in FIG. 3 the leaf nodes have half as many voxels along each edge as for the first level grids but this is an example; other resolutions may be used. Each leaf level grid represents the same real world volume as one first level voxel, but at a finer resolution. Each leaf level voxel may store a truncated signed distance function value and a weight representing the frequency of observations of that particular surface location obtained from depth maps so far.

Figure 4:
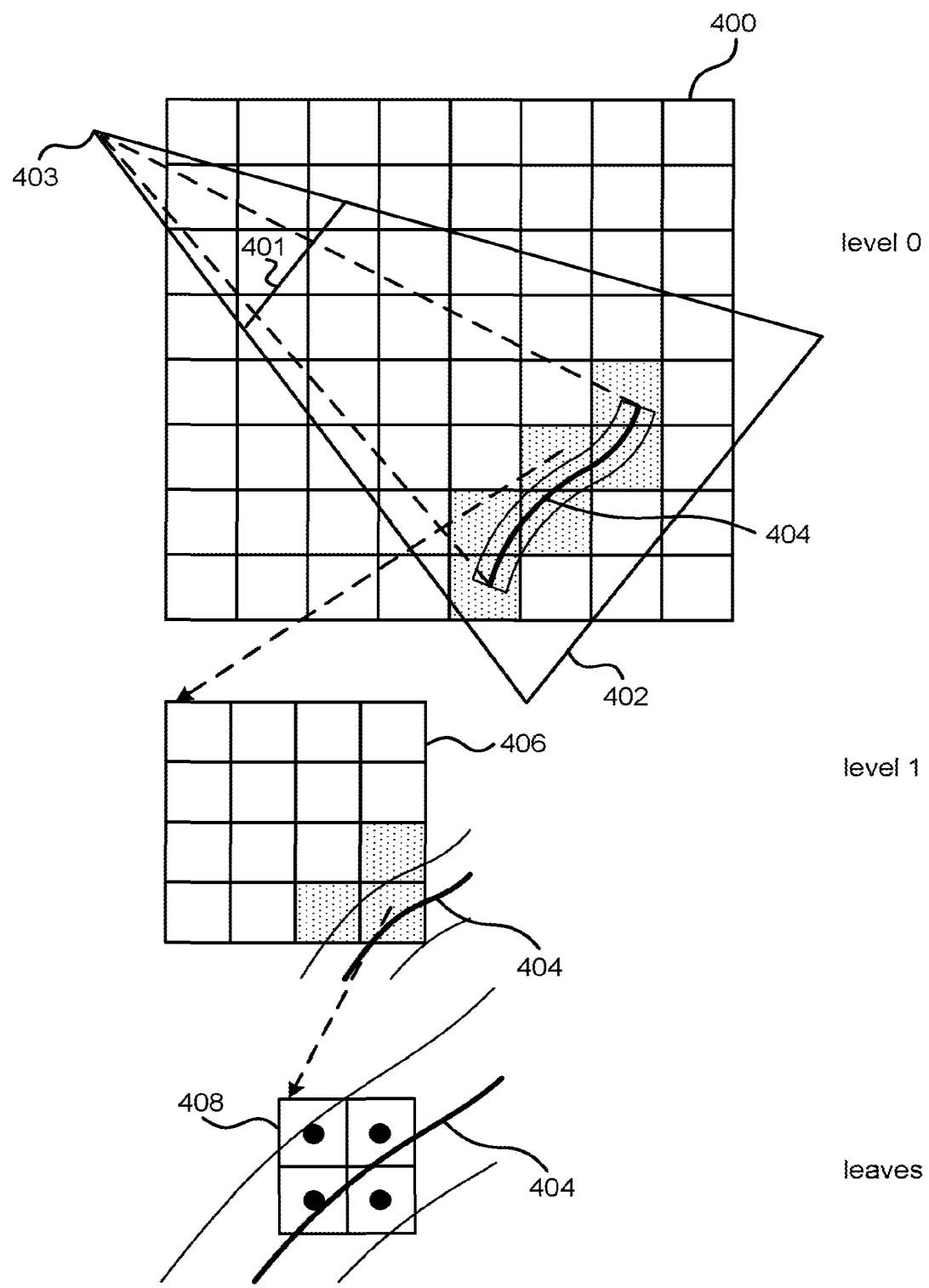
FIG. 4 is a schematic diagram of part of the hierarchical data structure of FIG. 3.

More detail of an example of using the hierarchical data structure of FIG. 3 to represent a volumetric truncated signed distance function is now given with reference to FIG. 4. This illustrates, in two dimensions, the three level hierarchical data structure of FIG. 3 with a root level grid 400, one first level node 406 and one leaf node 408 shown for clarity (although in practice there will be many more intermediate nodes and leaf nodes).

At the root level the 3D grid (shown in 2D in FIG. 4) has sixty four voxels. The camera frustum (the volume of real world space, mapped to the 3D model space, which may potentially be sensed by the camera in its current pose) is illustrated (in 2D rather than 3D) as triangle 402 with one corner "cut off" by line 401. The camera frustum is known from the current camera pose and from calibrated characteristics of the camera. The current camera position (in model space) is at corner 403 of triangle 402 and line 401 represents the plane in front of the camera and beyond which surfaces may be sensed. Six voxels which are both within the camera frustum and have a currently observed depth value (from the current depth map) which is near the truncated signed distance function (represented as line 404) are shaded. These six voxels meet the refinement strategy criteria. In this example, the other voxels of the root level either have no child nodes or have child nodes generated from previous depth maps. The six voxels which meet the refinement strategy criteria have a level one child node created (unless one already exists). For example, level one child node 406 is shown comprising a 3D grid which is represented in 2D in FIG. 4 as a four voxel sided square. The level one child nodes are created by allocating and clearing a place in memory at a parallel processing unit as described in more detail below. The memory is used to store a 3D grid of voxels representing a subdivision of the real world space represented by the parent voxel at the root level.

Each level one child node descending from one of the six voxels which meet the refinement strategy criteria at level 0 is assessed according to the level 1 refinement strategy. For example, the level 1 node has three shaded voxels which meet the level 1 refinement strategy in FIG. 4. For example, because these three voxels have an observed depth value in the current depth map which is near the truncated signed distance function 404.

The three shaded voxels which meet the level 1 refinement strategy each have a leaf node created (unless one already exists). For example, leaf node 408 is shown comprising a 3D grid which is represented in 2D in FIG. 4 as a block of four voxels. Each of these voxels which meets a leaf level refinement strategy has a truncated signed distance function value calculated together with a weight related to a frequency of observations of depth values for the real world surface location corresponding to the voxel. In various examples, a maximum of the calculated signed distance function values is selected and stored at each of the leaf level voxels which meets the refinement strategy. This helps to alleviate flickering near object edges in the signed distance function where cameras are used which tend to introduce noise at object boundaries in depth maps.

In various examples the refinement strategy takes into account a truncation region around the truncated signed distance function. This truncation region is illustrated schematically in FIG. 4 by two thin lines around line 404. The refinement strategy may comprise checking whether a current depth value (converted to model space) falls within a voxel that intersects a truncation region around the existing modeled signed distance function. In various examples the truncation region takes into account noise in the depth observations. For example, noise may be modeled as a Gaussian distribution with variance related to depth in such a way that the depth (denoted by symbol z) uncertainty of a depth sample grows in relation to the square of the depth from the camera. Therefore, in some examples, the truncation region is adaptive because it grows or shrinks in relation to the depth of the observation from the camera. By using an adaptive truncation region in this manner increased accuracy is found. However, it is not essential to use adaptive truncation as workable results are found with static truncation regions.

Figure 5:
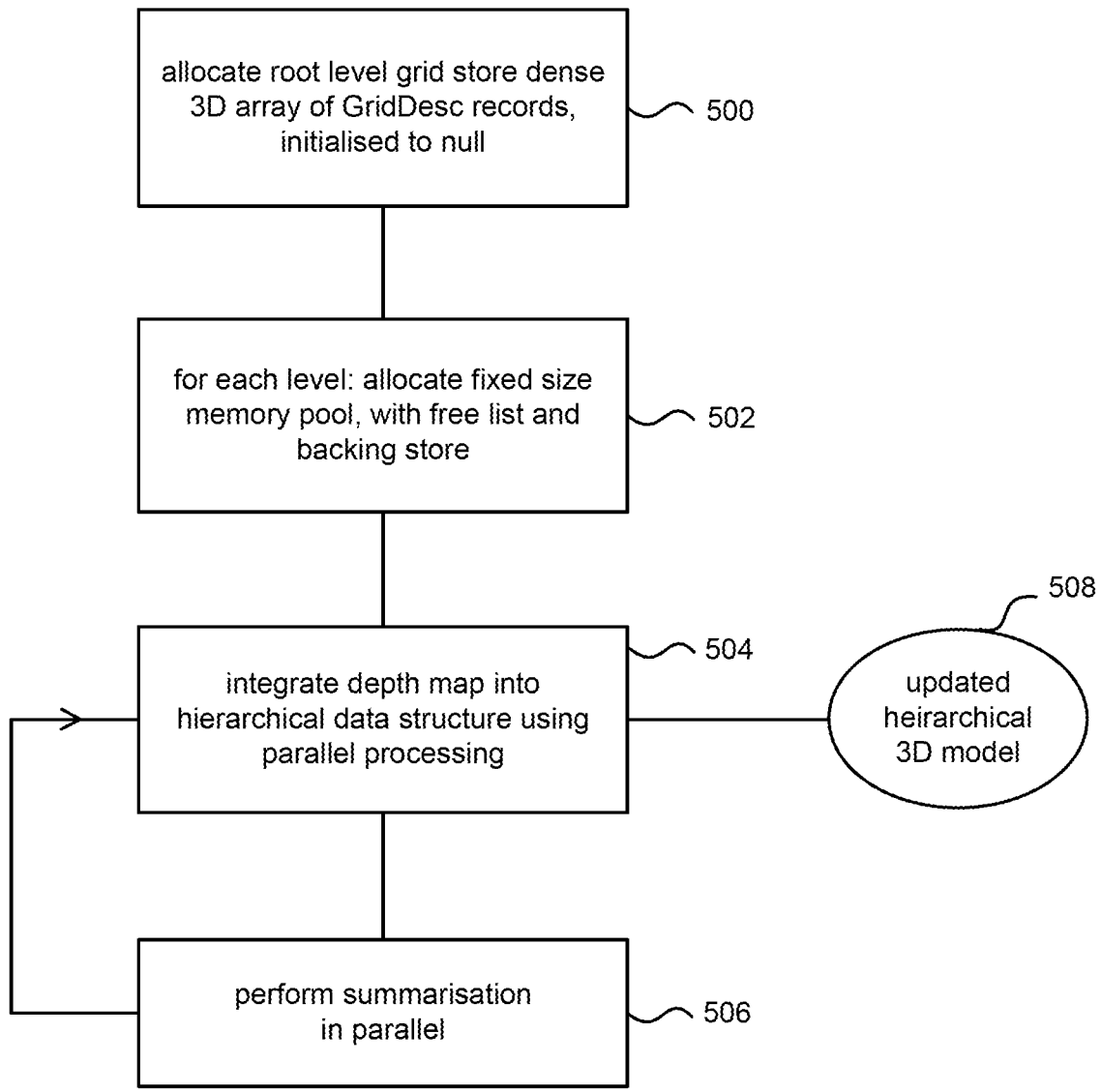
FIG. 5 is a flow diagram of a method of forming a hierarchical data structure such as that of FIG. 3.

FIG. 5 is a flow diagram of a method of forming a hierarchical data structure such as that of FIG. 3 which uses parallel processing in order to facilitate real time operation. As mentioned above with reference to FIG. 4 the level one child nodes are created by allocating and cleaning a place in memory at a parallel processing unit. As child nodes are created at other levels of the tree a similar memory allocation and cleaning process occurs. In an example, memory is allocated in the parallel processing unit in advance and this memory is taken for use as nodes are created using a type of ticketing process. The ticketing process uses a free list and a backing store. A free list is a queue of block indices of blocks in the associated backing store. A backing store is an array of fixed sized memory blocks where each block has size equal to a grid at a given level of the hierarchy.

The advance memory allocation comprises allocating 500 a root level grid in parallel processing unit memory and storing there a 3D array of GridDesc records (one for each voxel of the root level grid), initialized to null. A GridDesc record stores a pointer to any child node of the root level voxel and various other optional flags and information as described in more detail below.

The advance memory allocation may also comprise, for each level of the hierarchy (the number of levels is specified in advance) allocating 502 a fixed size memory pool in parallel processing unit memory, with a free list and a backing store.

As depth maps are received these are integrated 504 into the hierarchical data structure in a parallel processing process which involves creating nodes of the hierarchical data structure where needed. This results in an updated hierarchical 3D model 508. A summarization process 506 may optionally be performed on the hierarchical data structure after each depth map integration, or at other intervals. The summarization process may also comprise a pruning process which removes sub-trees of the hierarchical data structure where appropriate. For example, if sub trees are formed representing data which later becomes known as noise or empty space.

Figure 6:
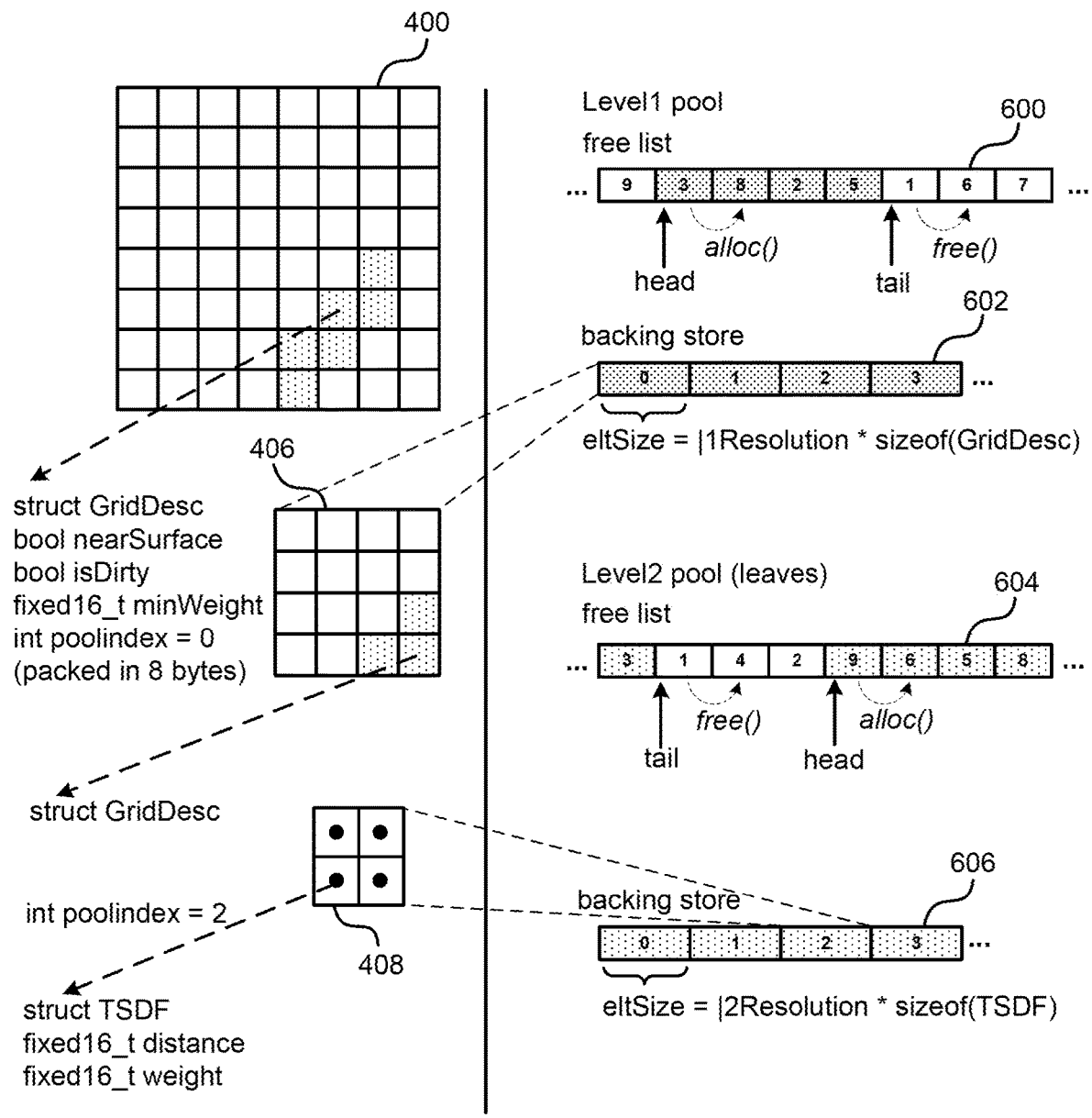
FIG. 6 is a schematic diagram of memory at a parallel processing unit used to form the hierarchical data structure of FIG. 4.

FIG. 6 gives more detail about the hierarchical data structure with respect to the GridDesc records used at the root and intermediate levels and with respect to the free lists and backing stores. FIG. 6 shows, in two dimensions, the three level heirarchical data structure of FIG. 3 with a root level grid 400, one first level node 406 and one leaf node 408 shown for clarity (although in practice there will be many more intermediate nodes and leaf nodes).

One GridDesc record is shown for a single root level voxel which is shown in FIG. 6 as being near to the truncated signed distance function. The GridDesc record is repeated below:

Struct GridDesc
Bool nearSurface
Bool isDirty
Fixed16_tminWeight
Int poolindex=0

This pseudo code describes how a structure, called GridDesc, comprises a Boolean parameter field called "nearSurface" which is true if the voxel, or any voxels in a subtree from the voxel, are near the surface, as currently modeled. The test for being near the surface may use an adaptive truncation region as described above.

The structure comprises a Boolean parameter field called "isDirty" which is true if the memory from the backing store which is to be used for holding the GridDesc record needs clearing.

The structure comprises a fixed point numerical value field called "fixed16_t minWeight" for storing a numerical value. At leaf nodes the numerical value is a weight related to a frequency of observations of depth values occurring in of the part of the real world represented by the voxel. At interior nodes and the root node, the numerical value stores the minimum of the weights of its children.

The structure comprises an integer field called "poolIndex" which represents an atomic operation for taking an item from the free list. The integer field poolIndex store a pointer to the node at the next level down. It may be thought of as a ticket as described earlier in this document.

To create the first level node 406 a free block is dequeued from the free list 600 using an atomic operation, assigned to the poolIndex field of the GridDesc structure. The free list is a queue of block indices, initialized to full (the list [0,1, . . . n]) where the symbol) indicates that n is not included in the list. In the example shown in FIG. 6 free block number 3 is at the head of the queue and is dequeued by taking memory block 3 from backing store 602. The backing store is an array of n fixed-sized blocks where each block has size equal to an entire grid at that level.

First level node 406 has its own GridDesc structure which has the same fields as described above. These are not shown in FIG. 6 for clarity except for the "int poolIndex" field which has the value 2 in this example, meaning that its child grid is at location 2 in the next level's backing store.

Second level node 408 has an associated structure, which is different from the GridDesc structure. In the example of FIG. 6 the leaf level structure is called struct TSDF and comprises a field storing a fixed point value which is a truncated signed distance function value associated with the voxel (referred to as fixed16_t distance in FIG. 6); and also comprising a field storing a fixed point value which is a weight associated with the frequency of depth observations received for the voxel (referred to as fixed16_t weight in FIG. 6). The free list 604 for level two (leaf level in this example) is shown in FIG. 6 as having index 2 dequeued from the head of the queue and block 2 from backing store 606 used for the TSDF structure.

Figure 7:
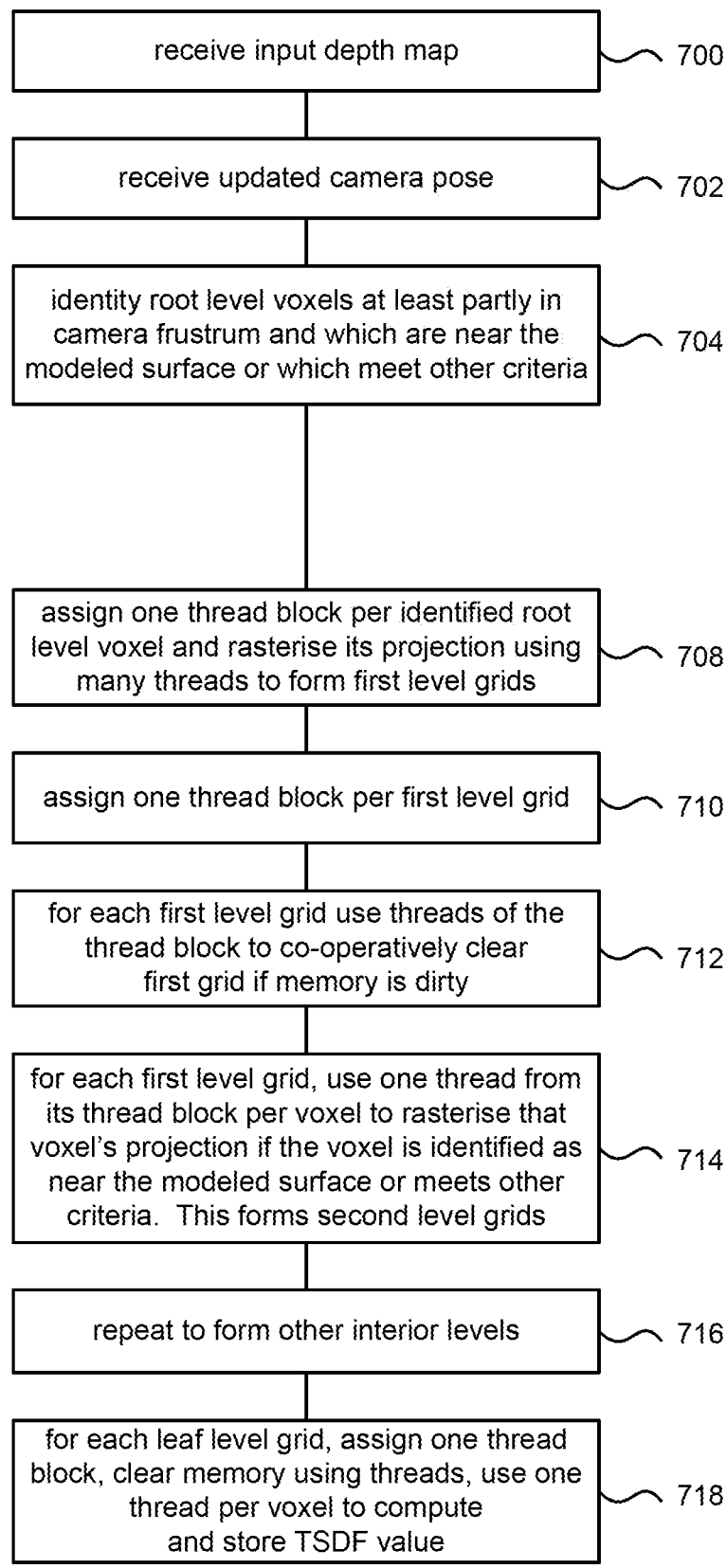
FIG. 7 is a flow diagram of a method of integrating a depth map into the hierarchical data structure of FIG. 3.

FIG. 7 is a flow diagram of a method of integrating a depth map into the hierarchical data structure of FIG. 3. An input depth map is received 700 and an updated camera pose 702 is received from the real time tracker of FIG. 1. Using the updated camera pose 702 and camera calibration information the camera frustum is calculated and applied to the current root level grid of the hierarchical data structure. Root level voxels in the root level grid are identified 704 which at least partly fall in the camera frustum and which are near the modeled surface; or which meet other criteria (such as already having subtrees with specified characteristics as described below).

The integration process may proceed in a top down manner. The process identifies which root voxels are to be updated and puts these into a queue. The process goes over the queue, doing the same for each level, until the leaves are reached. To identify root voxels to be updated, the process may look for root level voxels which touch the truncation region, or already have children and are in front of some surface in the current depth frame. An efficient way to do this is to project the root voxel to the screen, take its bounding box, and assign one thread to each pixel in the bounding box. The bounding box may be conservative such that not every pixel is inside the projection of the voxel. For each pixel two tests may be carried out. One to check whether the pixel is inside the projection of the voxel; and one to check whether the pixel is inside the truncation region. If one or both checks are true then the voxel is to be refined and it is placed in the queue.

Once the leaves are updates, the changes are summarized using a bottom up process. For example, where leaf nodes have been updated, a parent nodes of an updated child node can assess whether any of its child nodes are near the surface. If so, the parent node marks itself as such and tells its own parents.

In an example, one thread block is assigned 708 per identified root level voxel. Each thread block comprises a plurality of execution threads which may execute in parallel. For each identified root level voxel, its projection is rasterized using many threads to form the first level nodes.

The process moves to the first level nodes. One thread may be assigned 710 per first level node (also referred to as a grid). For each first level grid, if the memory block from the backing store is dirty, the process uses threads of the thread block to co-operatively clear 712 the memory block.

For each first level grid, the process identifies those voxels for which there are one or more depth values (from the input depth map) which are near the modeled surface; voxels which meet other criteria may also be identified (such as those which already have children). To achieve this one thread from the thread block may be used per voxel. Thus for each first level grid, one thread from its thread block is used per voxel to rasterize 714 that voxel's projection. This forms the second level grids.

The process of steps 710, 712, 714 may be repeated for other interior levels of the hierarchy until a leaf level is reached. For each leaf level grid a thread block is assigned 718. The memory of the assigned thread block is cleared if needed as described above. One thread per voxel is used to compute and store at the voxel a truncated signed distance function value and optionally a weight. More detail about the process of computing and storing the truncated signed distance function value and weight is given below with reference to FIG. 10.

In various examples, including the example of FIG. 7 above, a depth map is integrated into the hierarchical data structure in breadth-first order. For the interior levels of the tree, including the root, the process conservatively rasterizes the footprint of the depth map into successively finer voxel grids with recursion mediated by atomic queues. At the root grid, voxel indices are determined by conservatively intersecting it with the bounding box of the camera frustum. Since root voxels project to large hexagons on screen, one thread block may be assigned per voxel at the root level and many threads used to rasterize its projection. At interior levels, since voxels now project to smaller hexagons on screen, one thread block per grid is assigned, with one thread per voxel.

In an example, a process for integrating a depth map into the hierarchical data structure of FIG. 3 is given using the following pseudocode:

```
For each voxel v do in parallel
If intersect(v, frustum) then
    Bbox2D ← boundingBox2D(project(v))
    For all pixels p ∈ bbox2D do in parallel
        z ← depthMap[p]
        overlaps ← intersect(truncationRegion(z,σ(z),v)
    anyOverlaps ← parallelReduce(overlaps)
    if threadID = 0 then
        desc ← grid[v]
        descend ← (anyOverlaps or hasChildren(desc))
        if descend then
            enqueue(jobQueue.v)
            if !hasChildren(desc) then
                desc.poolIndex ← alloc( )
                desc.isDirty ← true
```

The above pseudo code describes using a thread for each voxel of a root level grid to carry out an integration process in parallel. The integration process involves checking if the voxel intersects the camera frustum and if so, calculating a two dimensional bounding box Bbox2D by using a function boundingBox2D with an argument project (v). For all the pixels in an input depth map which are a member of the 2D bounding box the process proceeds in parallel to look up the depth value z at the pixel and check if the depth value intersects with an adaptive truncation region around the signed distance function at the voxel.

A parallel reduce operation is applied to remove duplicates from the set of overlaps (the set of voxels having pixels of the depth map which intersect the adaptive truncation region).

If there is an available thread then the variable desc is set to the voxel and the flag descend is set to true if the voxel has children or if there are any members of the overlaps set.

If the flag descend is set to true then a job is placed on the queue for voxel v. Atomic job queues may be allocated in memory. When the process calculates that a voxel is to be swept, its index is atomically enqueued onto the job queue. To work on the next level, the process may atomically dequeue voxel indicates from the input job queue.

If the voxel has no children then memory is allocated for a child of the voxel and the isDirty flag is set if appropriate.

Figure 8:
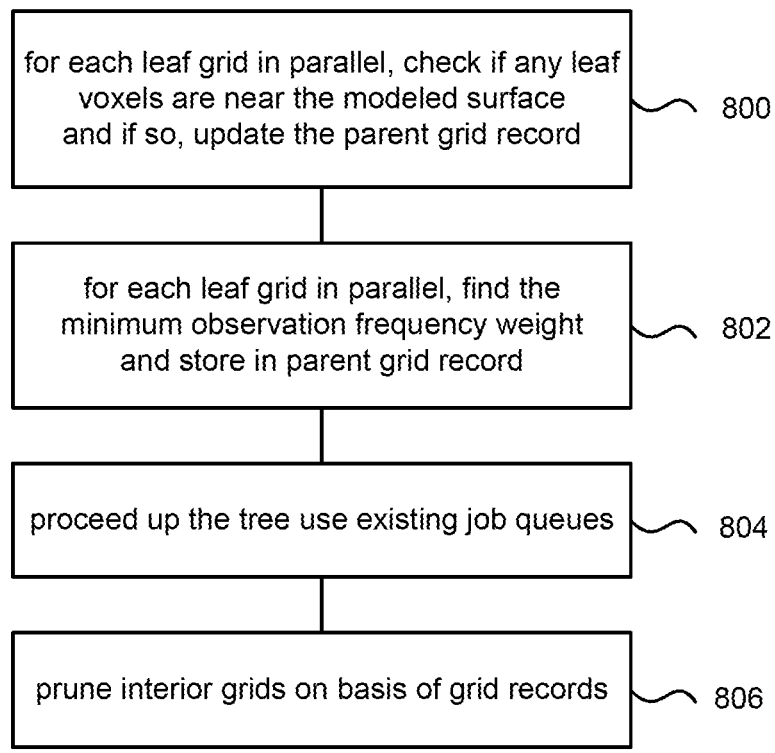
FIG. 8 is a flow diagram of a method of summarization and pruning of a hierarchical data structure such as that of FIG. 3.

FIG. 8 is a flow diagram of a method of summarization and pruning (also referred to as garbage collection) of a hierarchical data structure such as that of FIG. 3. The summarization and pruning processes may use metadata stored at the GridDesc records of the nodes. For example, the nearSurface flag of a node may be used to indicated whether any voxel in a subtree is potentially near the modeled surface. The nearSurface flag may be used during raycasting to skip entire subtrees as described in more detail below with reference to FIG. 9. The minWeight value may be used to identify subtrees that may be pruned as they represent free space. This is now described in more detail with reference to FIG. 8.

Each leaf node is swept by parallel threads. For example, for each leaf node (also referred to as a leaf grid) in parallel, check 800 if any leaf voxels are near the modeled surface and if so, update the parent grid record by setting its nearSurface flag to true. In an example the check 800 comprises checking if any signed distance function values are near the surface geometry; that is, checking if any signed distance function values have a magnitude less than the diagonal of a leaf voxel. A parallel reduction of the results of these checks for the leaf level voxels may be made and the result used to set the nearSurface flag of the parent node.

For each leaf node in parallel, find 802 the minimum observation frequency weight and store that in the parent grid record. Parallel reduction may be used to find the minimum weight in a leaf grid.

Summarization proceeds 804 up the tree using the existing job queues until the root level is reached.

The interior level grids (nodes) may then be pruned 806 on the basis of the grid records. For example, the minWeight field of the GridDesc records is optionally used as a heuristic for garbage collection. If an interior voxel has a sufficiently high minWeight and is not nearSurface, then it is unlikely to be nearSurface in the future and may be "frozen" as free space. An interior voxel identified on this basis may have its subtree deleted in the next integration pass and integration for this region of real world space may be skipped in future.

Figure 9:
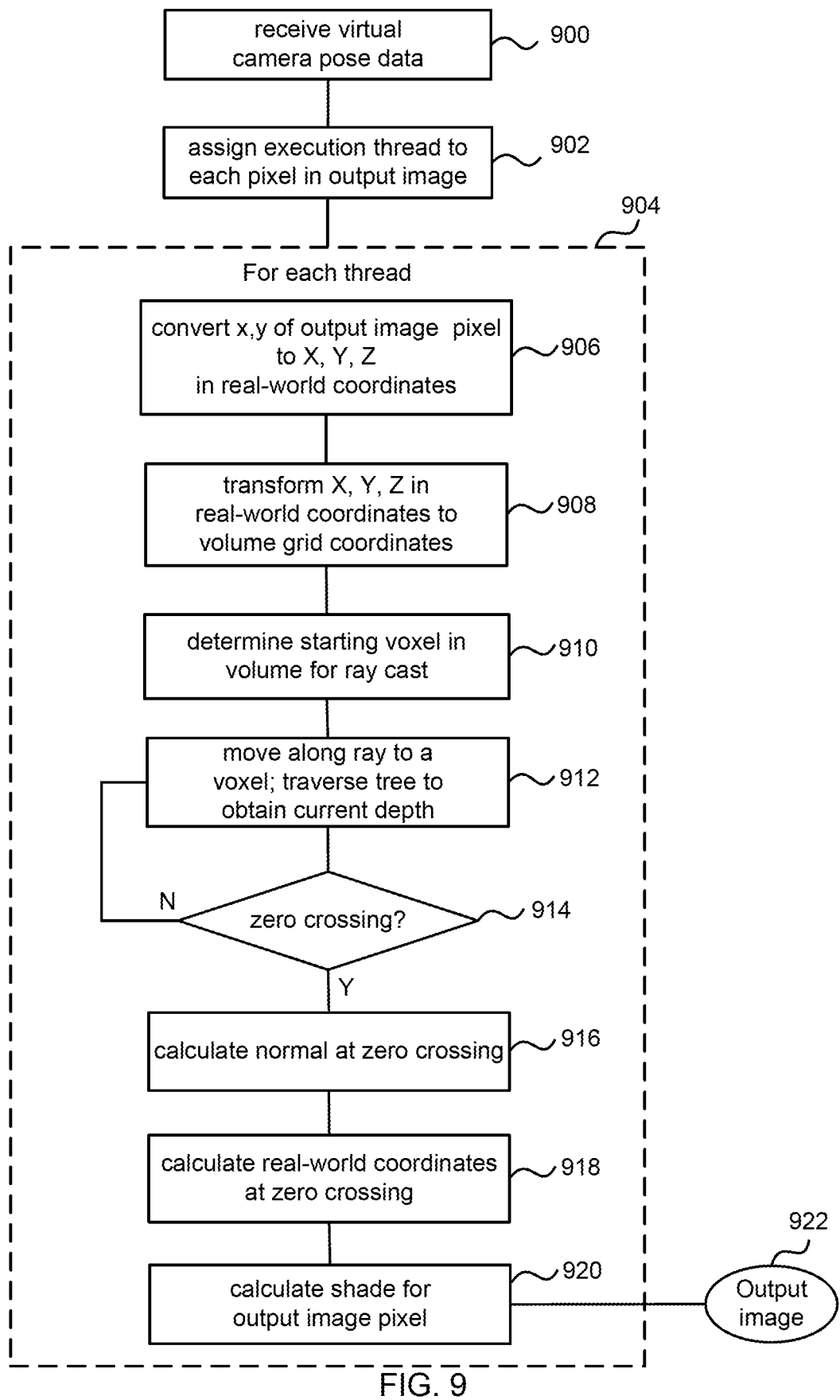
FIG. 9 is a flow diagram of a method of rendering.

FIG. 9 is a flow diagram of a method of rendering an image from the 3D model in hierarchical form. The rendering process comprises raycasting many rays from the desired output image elements (in real world coordinates) into the 3D model. The raycasting process may use space skipping on the basis of the metadata in the hierarchical data structure GridDesc records. This is now described with reference to FIG. 9. which shows a parallelizable process for raycasting from the 3D model in hierarchical form, which is suited for execution on a GPU or multi-core CPU in a similar manner to the model generation process above.

To render a view of the model, a pose of a virtual camera defining the viewpoint for the image to be rendered is firstly received 900. This pose can be in the form of a 6DOF location and orientation of the virtual camera. A separate execution thread is then assigned 902 to each pixel in the image to be rendered.

The operations shown in box 904 are then performed by each execution thread to determine the value (e.g. shade, color etc.) to be applied to the thread's associated pixel. The x- and y-coordinates for the pixel associated with the thread are used with the pose of the virtual camera to convert 906 the pixel into real-world coordinates, denoted X, Y, Z. The real-world coordinates X, Y, Z can then be transformed 908 into voxel coordinates in the 3D hierarchical model.

These coordinates define a point on a ray for the pixel having a path emanating from the virtual camera location through the 3D hierarchical model. It is then determined 910 which voxel in the 3D hierarchical model root level grid is the first touched by this ray, and this is set as the starting voxel for the raycasting. The raycasting operation traverses the tree 912 in a depth first search manner to retrieve a signed distance function value for this location. This is done by checking if the nearSurface flag is set to true. If so, the process moves down the tree in the same manner until a leaf node is reached. If at any point the nearSurface flag is set to false, the process moves back up the tree in a depth first search manner along the ray. This enables space skipping to occur by using the nearSurface flag metadata.

When a leaf node is reached a check is made for a zero-crossing. If no zero-crossing is found the process moves back up the tree to the parent node and continues with any other child nodes of that parent node in a depth first search manner.

If a zero crossing is found (i.e. a sign change between the averaged signed distance function values stored in one voxel on the ray at the leaf level to the next voxel along the ray at the leaf level), the process calculates 916 a surface normal at the zero crossing. Optionally, the zero crossing check process can be arranged to determine the presence of a sign-change only from positive through zero to negative. This enables a distinction to be made between surfaces viewed from the front and surfaces viewed from "inside" the object.

When a zero-crossing is detected, this indicates the presence of a surface in the model. Therefore, this indicates the leaf level voxel at which the surface intersects the ray. In one example, the surface intersection point along a ray can be computed using a simple linear interpolation given trilinearly sampled points either side of the detected zero crossing to find the point at which a zero occurs. At the point at which the zero-crossing occurs, a surface normal is calculated 916. This can be performed by taking truncated signed distance function differences with neighboring voxels. This estimates a gradient which is the surface normal. In one example, the surface normal can be computed using a backward difference numerical derivative, as follows:

$$\hat{n}(x) = \frac{\nabla f(x)}{\|\nabla f(x)\|}, \nabla f = \left[\frac{\partial f}{\partial x}, \frac{\partial f}{\partial y}, \frac{\partial f}{\partial z}\right]^T$$

Where $\hat{n}(x)$ is the normal for at point x, and $f(x)$ is the signed distance function value for voxel x. This derivative can be scaled in each dimension to ensure correct isotropy given potentially arbitrary voxel resolutions and reconstruction dimensions.

The process may cache and reuse the tree traversal from the current position on the ray to enable performance at step 912 to be improved. To compute a surface normal using differences with neighbors, the process uses multiple accesses. The neighbors are likely to be in the same grid as the initial point, so the process is able to cache which grid it is in and reuse it when appropriate.

The coordinates of the voxel at which the zero-crossing occurs are converted 918 into real-world coordinates, giving the real-world coordinates of the location of surface in the model. From the real-world coordinates of the surface, plus its surface normal, a shade and/or color can be calculated 920. The calculated shade and/or color can be based on any suitable shading model, and take into account the location of a virtual light source.

As mentioned, the operations in box 904 are performed by each execution thread in parallel, which gives a shade and/or color for each pixel in the final output image. The calculated data for each pixel can then be combined to give an output image 922, which is a rendering of the view of the model from the virtual camera.

In an example, the process of step 912 of FIG. 9 may be implemented as follows. The process maintains as state a previous distance along the ray $t_p$ (which is the distance along the ray to the previous root level voxel), a previous signed distance function value $d_p$ (from the tree traversal at the previous root level voxel), and a stack of voxel indices down the hierarchy. The value of $t_p$ is set to zero (at the camera viewpoint) and the tree is traversed to retrieve the current depth $d_p$. At each iteration the process steps to the next voxel at the current level. If at an interior node and the nearSurface flag is set, the process finds the closest voxel at the next level down and pushes that onto the stack. Otherwise the process does nothing. If the process is at a leaf node, then a test is made whether there is a zero crossing. A zero crossing occurs when $d_p>0$ and $d_c<0$. If a zero crossing is found the surface is at $$t_z = t_p + \frac{d_p}{d_p - d_c}$$

Otherwise the process sets $d_p = d_c$ and continues. If the process steps outside the bounds of the current grid the stack is popped so as to move back up the tree.

Figure 10:
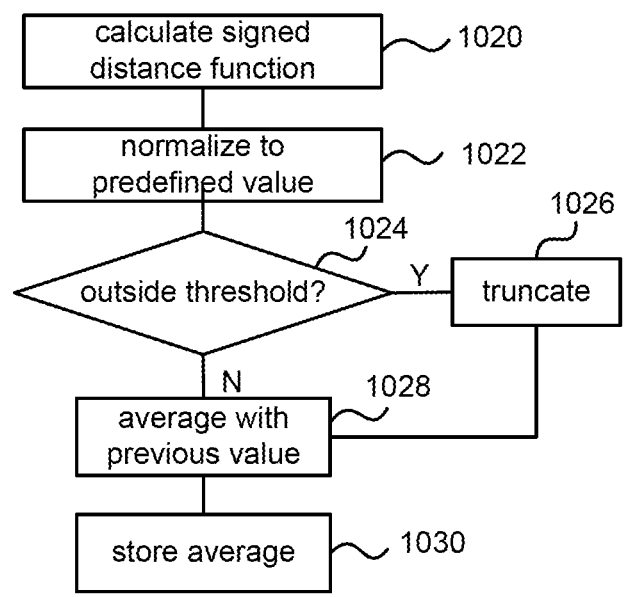
FIG. 10 is a flow diagram of a method of integrating a depth map into a dense 3D environment model.

FIG. 10 is a flow diagram of a method computing and storing a truncated signed distance function value and gives more detail of the process of step 718 of FIG. 7. A signed distance function calculation gives the value of the distance between the current voxel and the corresponding point in the depth image and is signed such that voxels outside (i.e. external to) the corresponding point in the depth image (from the camera's perspective) are given a positive distance, and voxels inside (i.e. internal to) the corresponding point in the depth image (from the camera's perspective) are given a negative distance. A value of zero indicates that the associated voxel is exactly coincident with the corresponding point. The signed distance function can be calculated readily from the depth value in the depth image at a location corresponding to the center of the voxel, minus the depth axis location of the center of the voxel. It is possible to use the center of the voxel where it is possible to assume that leaf voxels are smaller than a pixel of the input depth maps.

The signed distance function value may be normalized 1022 to a predefined distance value. In one example, this predefined value can be a small distance such as 5 cm, although any suitable value can be used. For example, the normalization can be adapted depending on the noise level and the thickness of the object being reconstructed. This can be defined manually by the user, or derived automatically though analysis of the noise in the data. It is then determined 1024 whether the normalized distance is greater than a positive threshold value (if the signed distance is positive) or less than a negative threshold value (if the signed distance is negative). If so, then the signed distance function values are truncated 1026 to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function (TSDF).

The normalized (and if appropriate, truncated) signed distance function value is then combined with any previous value stored at the current voxel. In the case that this is the first depth image incorporated into the 3D model, then no previous values are present. However, as further frames from the depth camera are received and incorporated, then values can already be present at a voxel.

In one example, the signed distance function value is combined with a previous value by averaging 1028. This can assist with building models of environments with moving objects, as it enables an object that has moved to disappear over time as the measurement that added it becomes older and averaged with more recent measurements. For example, an exponentially decaying moving average can be used. In another example, the average can be a weighted average that uses a weighting function relating to the distance of the associated voxel from the depth camera. The averaged signed distance function values can then be stored 1030 at the current voxel.

In another example, two values can be stored at each leaf voxel. A weighted sum of the signed distance function values can be calculated and stored, and also a sum of the weights calculated and stored. The weights may be frequencies of depth observations. The weighted average can then be computed as (weighted sum)/(sum of weights).

Using a hierarchical structure as described above enables interactive reconstruction of relatively large volumes. For example, at $1024^3$ resolution, (4 m)$^3$ with (4 mm)$^3$ voxels or (8 m)$^3$ with (8 mm)$^3$ voxels. To further scale to unbounded physical dimensions the 3D environment modeling system may decouple the physical volume from the working set. This is also applicable where a 3D grid is used rather than a hierarchical structure.

A working set is parts of memory that an algorithm is currently using. In the examples where graphics processing units are used the working set may be parts of GPU memory currently being used by the 3D environment modeling system or rendering system. In examples, a working set may be defined as a set of fixed 3D array indices in GPU memory which is equal to a root grid resolution of the hierarchical structure. In embodiments where the 3D model is stored using a regular grid (without a hierarchical structure) the working set may be defined as a set of fixed 3D array indices in GPU memory which is equal to the 3D grid resolution.

A resolution (the number of voxels) at each level of the hierarchical structure may be specified together with a leaf level voxel size in meters. These parameters multiply to determine the physical size of a root voxel in meters. A world coordinate system may be quantized into units of root voxels which serve as keys indexing subtrees of the hierarchy.

An active region may be defined as a cubical (or other shaped) subset of the world coordinate system (in meters) that is centered on the camera's view frustum, but whose origin is quantized to a root voxel in the world. To ensure zero contention, the active region's effective resolution may be one root voxel less than that of the working set along each axis. This enables mapping voxels of the active region to indices of the working set using modular arithmetic.

Figure 11:
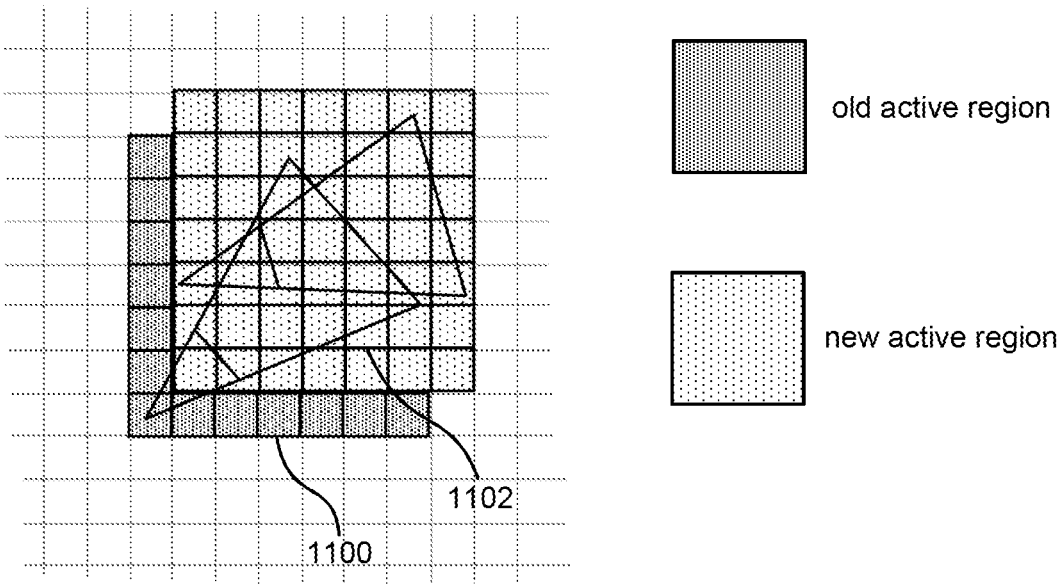
FIG. 11 is a schematic diagram of an active region and a working set.
Figure 11:
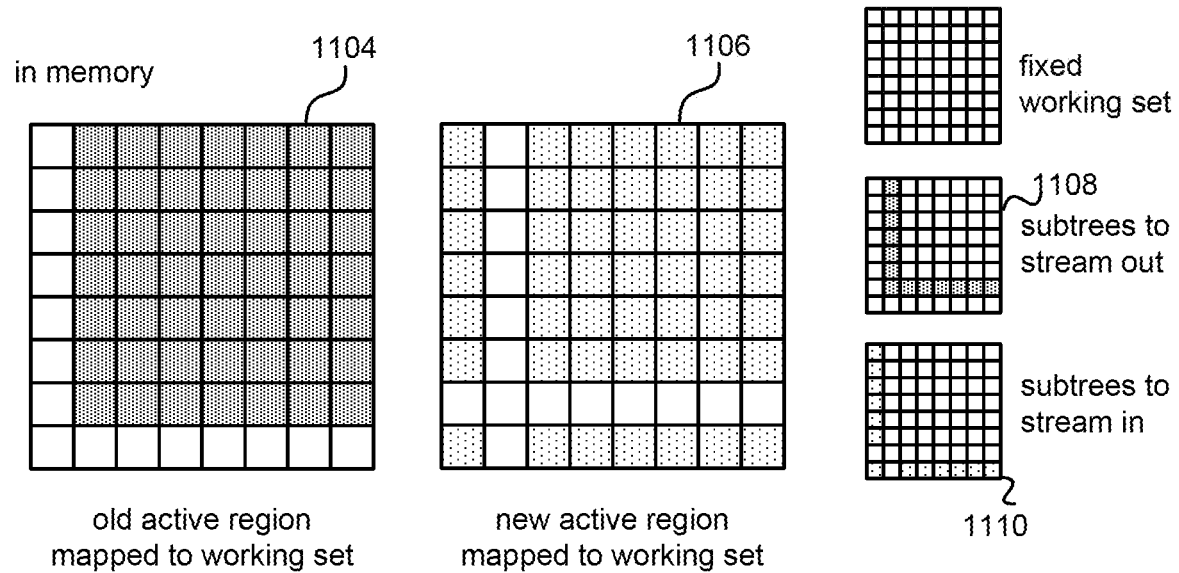

FIG. 11 is a schematic diagram of an active region and a working set in two dimensions. Active regions 1100, 1102, 1104, 1106 are shown as grids. For active region 1104 the working set is depicted by the cells of the grid which contain dots. For active region 1106 the working set is also depicted by the cells of the grid which contain dots. Active regions 1100 and 1102 are shown in relation to a world coordinate system. These active regions are associated with different camera positions; each camera frustum is depicted using a triangle as in FIG. 4. Each cell of the active region grids in FIG. 11 corresponds to a root voxel in the world.

The active region and the working set may be used to identify indices of the 3D model which may be streamed between the parallel processing unit memory and memory at the host computing device. Indices may be streamed out from GPU memory to the host or vice versa. For example, in FIG. 11 active region 1100 corresponds to active region 1104 and represents the situation for an old camera position. Active region 1102 corresponds to active region 1106 and represents a situation for a new camera position. Considering old active region 1104 the blank cells represent indices (or subtrees) which may be streamed out to the host as these are outside the working set. Considering new active region 1106 the subtrees to be streamed out are represented by cells filled with dots in grid 1108 and the subtrees to be streamed out are represented by cells filled with dots in grid 1110.

Figure 12:
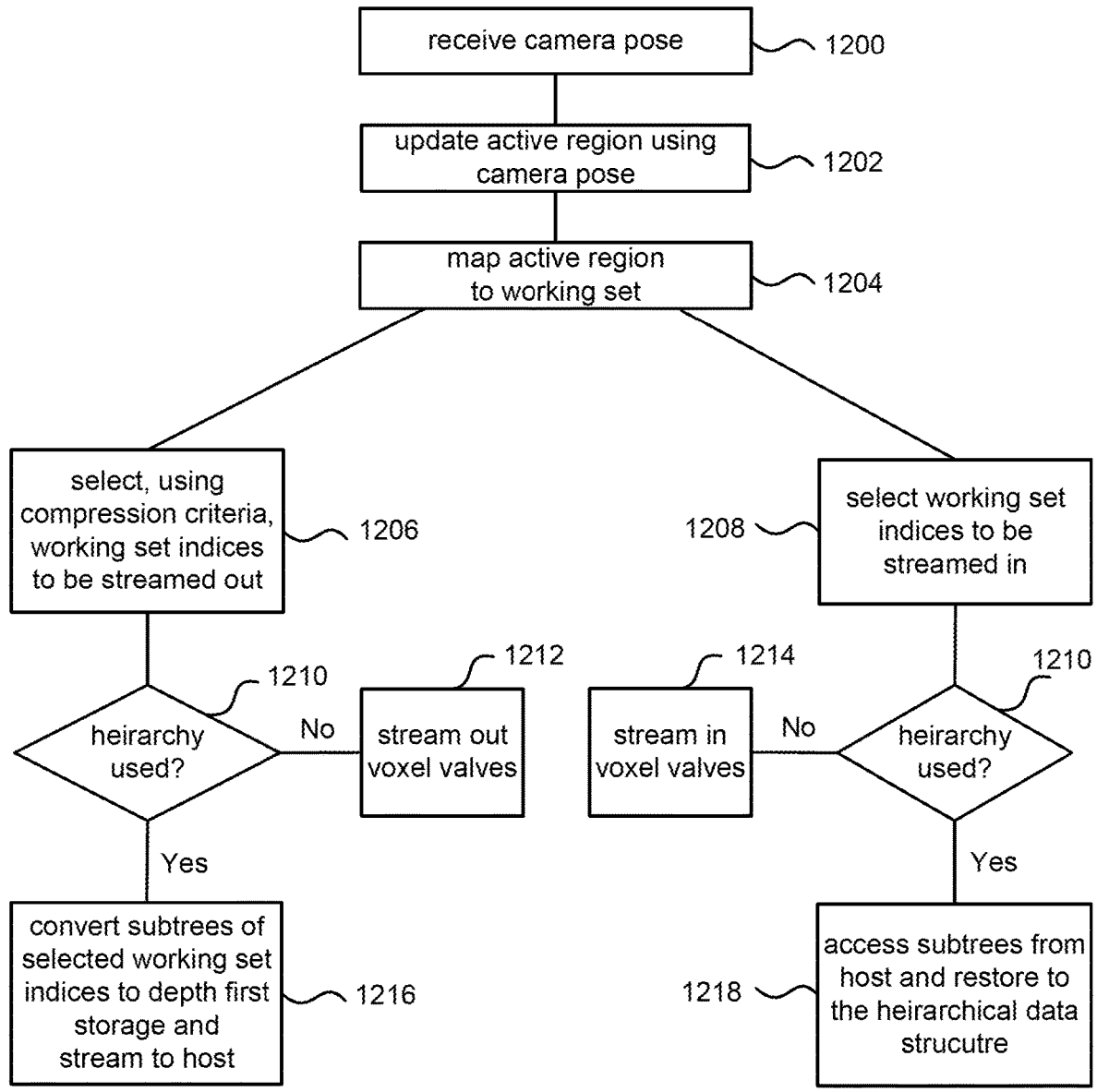
FIG. 12 is a flow diagram of a method of streaming.

FIG. 12 is a flow diagram of a method of streaming 3D model data between memory at a parallel processing unit and memory at a host computing device. A camera pose is received 1200, for example, from real time tracker 114 of FIG. 1. An active region is calculated 1202 or updated using the received camera pose on the basis of the definition of an active region given above and knowledge of the resolution of the 3D model (as a regular grid or as a hierarchical structure). The active region is mapped 1204 to the working set. Using the knowledge of the active region and the working set mapping, working set indices to be streamed out are selected 1206 and working set indices to have data streamed in are selected 1208. For streaming out these may be working set indices which have become absent from the new active region since the previous active region. For streaming in these may be working set indices which are now present in the new active region and were absent in the previous active region.

Compression criteria may also be used during the selection 1206 of working set indices for streaming out. If a hierarchy is being used (see decision point 1210) then subtrees of the selected working set indices may be converted 1216 to depth first storage and streamed to the host. If a hierarchy is not being used the selected voxel values are streamed out 1212.

During streaming in, if a hierarchy is being used (see decision point 1210) subtrees are accessed from the host and restored 1218 to the hierarchical data structure. If a hierarchy is not being used the process streams 1214 in voxel values from the host.

Figure 13:
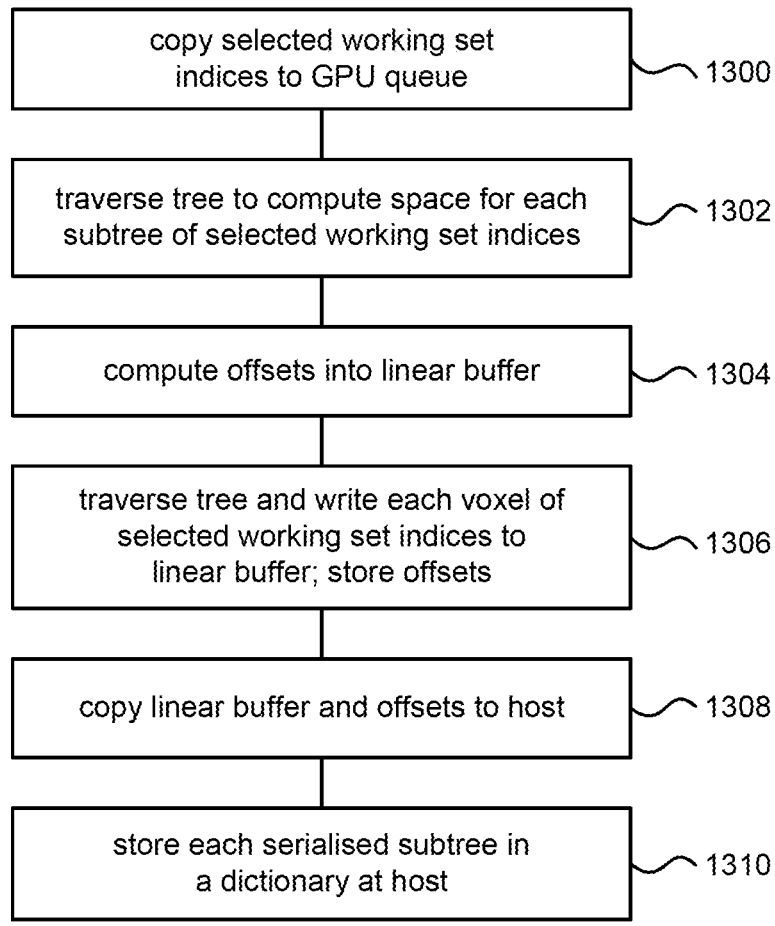
FIG. 13 is a flow diagram of the streaming out part of the method of FIG. 12 in more detail.

In an example described with reference to FIG. 13, streaming from GPU to host uses two breadth-first traversals of the hierarchy. Given a set of working set indices to stream out on the host, the process copies 1300 these into a GPU queue and performs a tree traversal 1302 to determine how much space is needed for each subtree (using parallel reduction to compute the sum). The process performs a parallel prefix scan to compute 1304 offsets into a linear buffer where each subtree may be stored. A tree traversal 1306 is made to write each voxel into the linear buffer, replacing poolIndex with a byte offset from the beginning of each subtree. This operation converts a forest (in the form of a list of trees) from breadth first storage to depth first storage. The linear buffer and list of offsets may be copied 1308 to the host and each subtree stored 1310 in a dictionary. Streaming from host to GPU may be analogous.

In some examples a layered volumes scheme is used to enable larger scanning and viewing distances by using multiple graphics processors or other parallel processing units. The layered volumes scheme may be used where the 3D model is stored as either a regular grid, or as a hierarchical structure.

Figure 14:
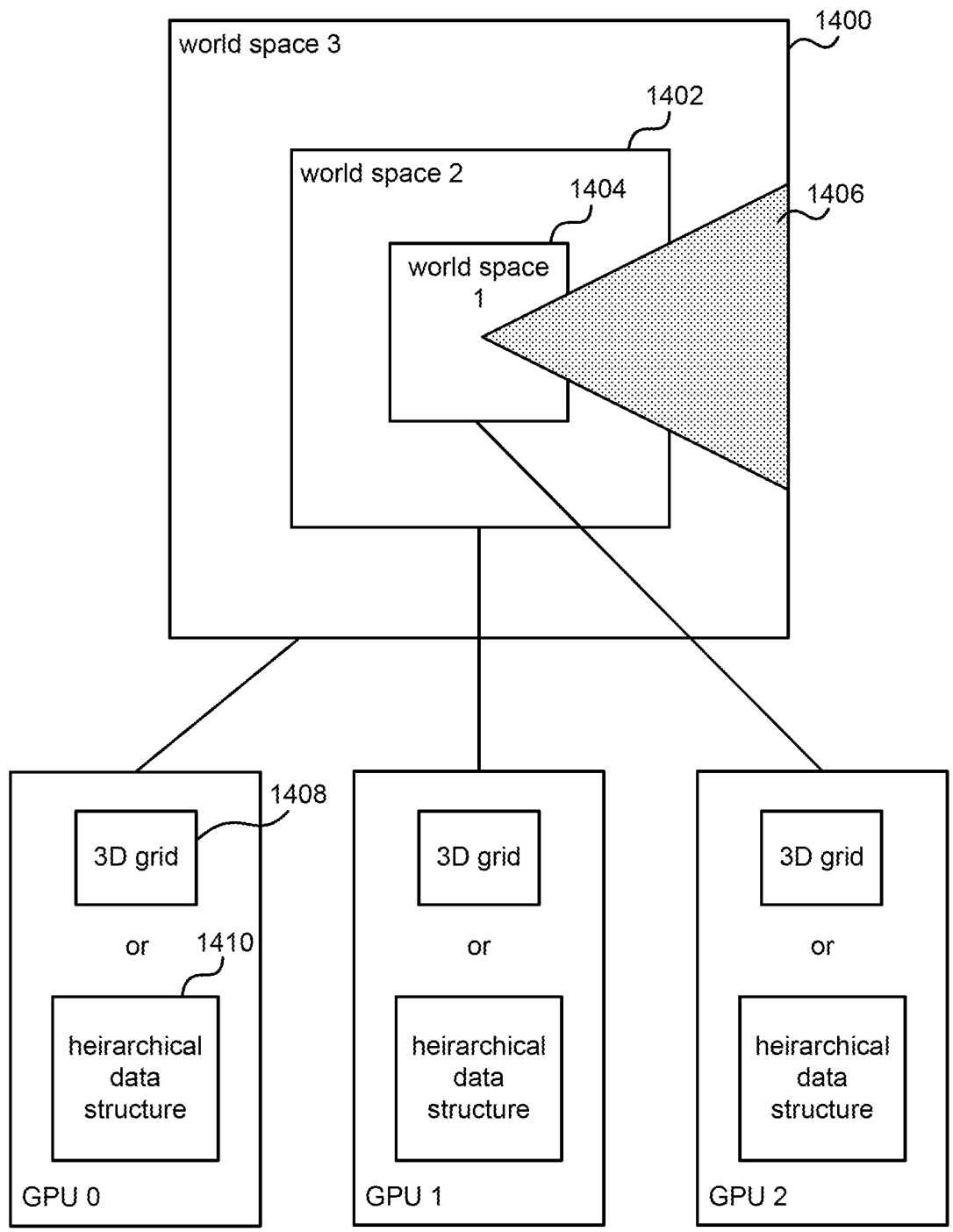
FIG. 14 is a schematic diagram of layered volumes in world space and of a plurality of parallel computing devices used to represent the world space volumes.

For example, FIG. 14 shows three GPUs (GPU0, GPU1 and GPU2) each used to store a 3D model or part of a 3D model reconstructed by the 3D environment modeling system described herein (or any other suitable 3D environment modeling system). GPU0 is used to represent world space 3 1400, GPU1 is used to represent world space 2 1402 and GPU 2 is used to represent world space 1 1404. Triangle 1406 represents a camera frustum. The world spaces each have different physical dimensions. For example, world space 3 may be larger than world space 2 and world space 2 may be larger than world space 1. The world spaces may be centered on the same physical location so that world space 3 contains world space 2 which contains world space 1. The memory used at each of the GPUs may be the same. In this way GPU1 captures a coarse scale surface geometry, GPU1 captures an intermediate scale surface geometry and GPU2 captures a fine scale surface geometry.

Figure 15:
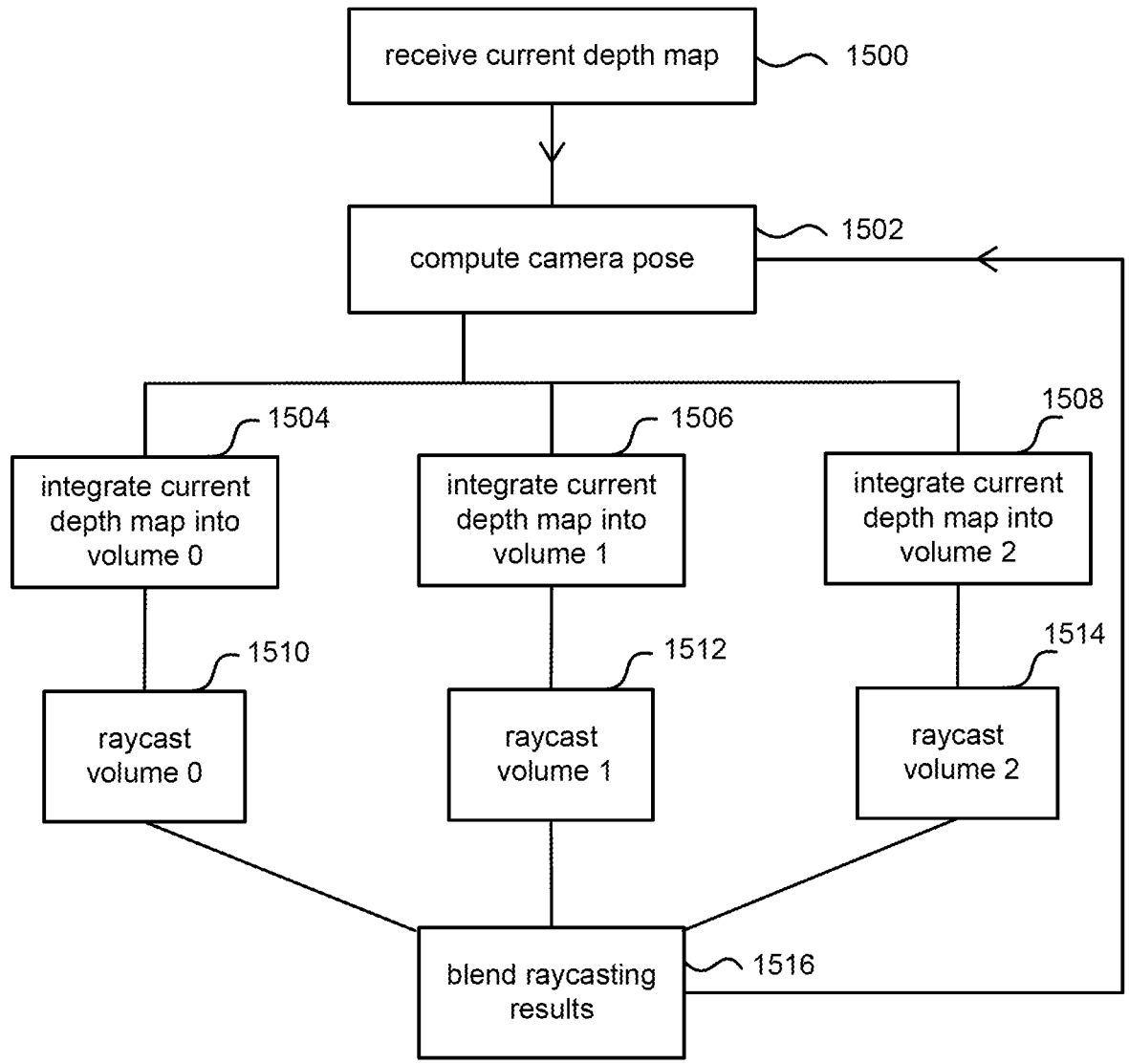
FIG. 15 is a flow diagram of a method of integrating a depth map into layered volumes.
Figure 16:
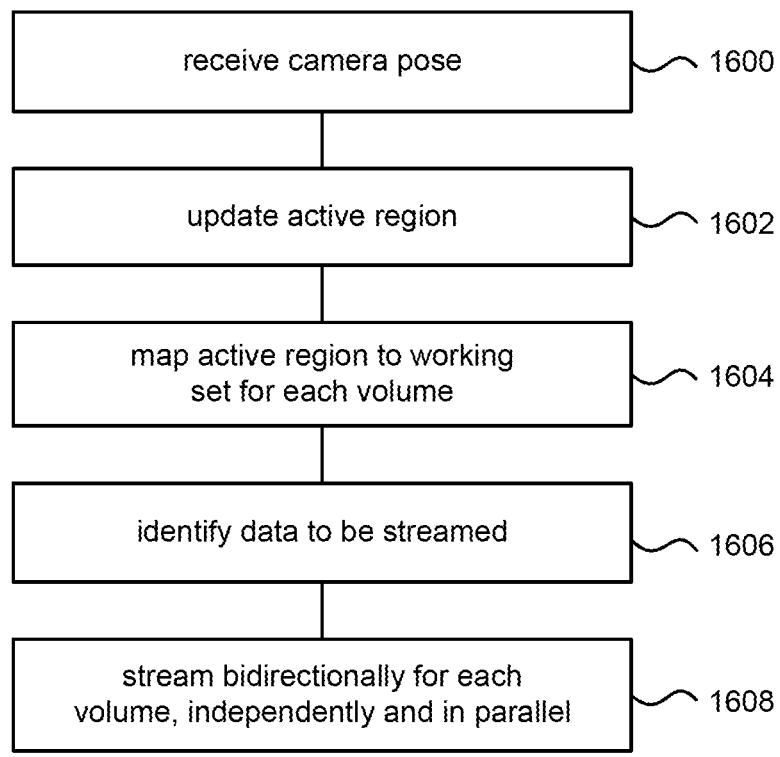
FIG. 16 is a flow diagram of a method of streaming implemented for layered volumes.

FIG. 15 is a flow diagram of a method of integrating a depth map into layered volumes, such as the layered volumes of FIG. 14. A current depth map is received 1500 and the current camera pose is computed 1502. The current depth map is integrated into each of volumes 0, 1 and 2 at steps 1504, 1506 and 1508 respectively. A depth map integration process as described above may be used according to whether the 3D model is a regular grid or a hierarchical structure.

To render an image from the 3D model a raycasting process (such as described herein) may be applied 1510, 1512, 1514 to each volume separately and in parallel. The raycasting results are then blended 1516 or aggregated. The raycasting results may be fed back for use in the camera pose computation in some examples.

Where layered volumes are used it is possible to apply streaming. For example, a camera pose is received 1600 and the active region is updated 1602 as described above. The active region is mapped to a working set for each volume 1604 and this enables identification 1606 of data to be streamed in or out from the volume. Streaming takes place 1608 bidirectionally for each volume independently and in parallel.

Figure 17:
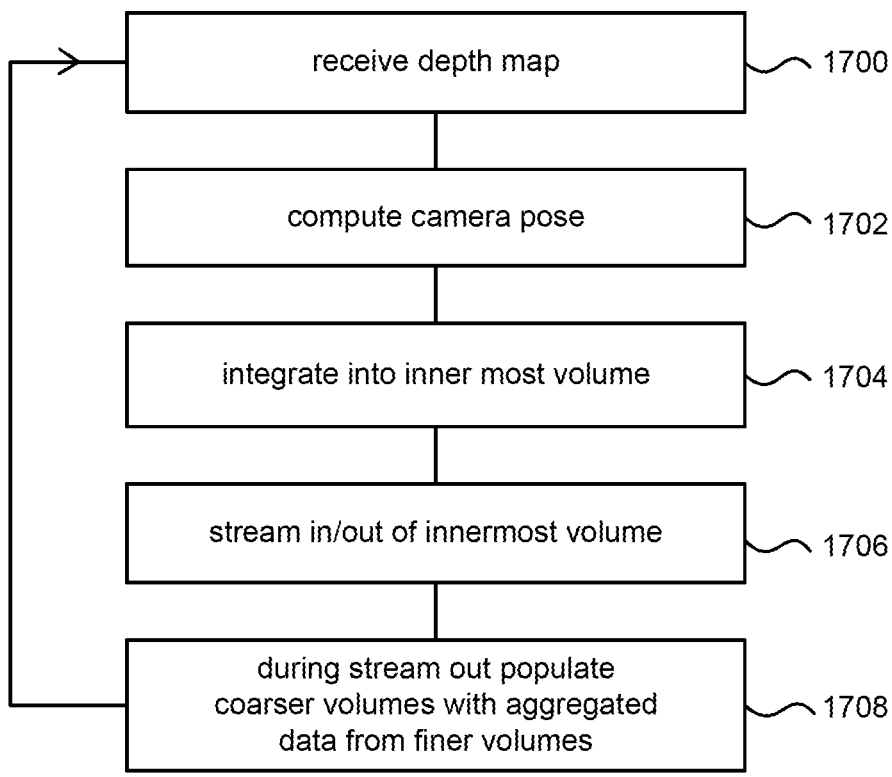
FIG. 17 is a flow diagram of another method of integrating a depth map into layered volumes.

FIG. 17 is a flow diagram of another method of integrating a depth map into layered volumes. A depth map is received 1700 and an associated camera pose is computed 1702. The depth map is integrated into the innermost volume 1704 and streaming 1706 is applied to the innermost volume. During streaming out the process populates 1708 coarser volumes with aggregated data from finer volumes.

In an example, an apparatus for constructing a 3D model of a real-world environment comprises:

an input interface arranged to receive a stream of depth maps of the real-world environment captured by a mobile environment capture device;

at least one parallel processing unit arranged to calculate, from the depth maps, a 3D model comprising values representing surfaces in the real-world environment;

a memory at the parallel processing unit arranged to store the 3D model in a hierarchical structure comprising a root level node, a plurality of interior level nodes and a plurality of leaf nodes, each of the nodes having an associated voxel grid representing a portion of the real world environment, the voxel grids being of finer resolution at the leaf nodes than at the root node;

the parallel processing unit arranged to compute and store, at the root and interior nodes, metadata describing the hierarchical structure, and to compute and store at the leaf nodes, the values representing surfaces.

For example, the parallel processing unit is arranged to form interior nodes and leaf nodes by allocating memory blocks using atomic queues.

For example, the parallel processing unit is arranged to form interior nodes and leaf nodes on the basis of a refinement strategy which takes into account distances of depth observations from surfaces modeled by the 3D model.

For example, the apparatus has the parallel processing unit being at least partially implemented using hardware logic selected from any one or more of: a field-programmable gate array, a program-specific integrated circuit, a program-specific standard product, a system-on-a-chip, a complex programmable logic device, a graphics processing unit Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 18:
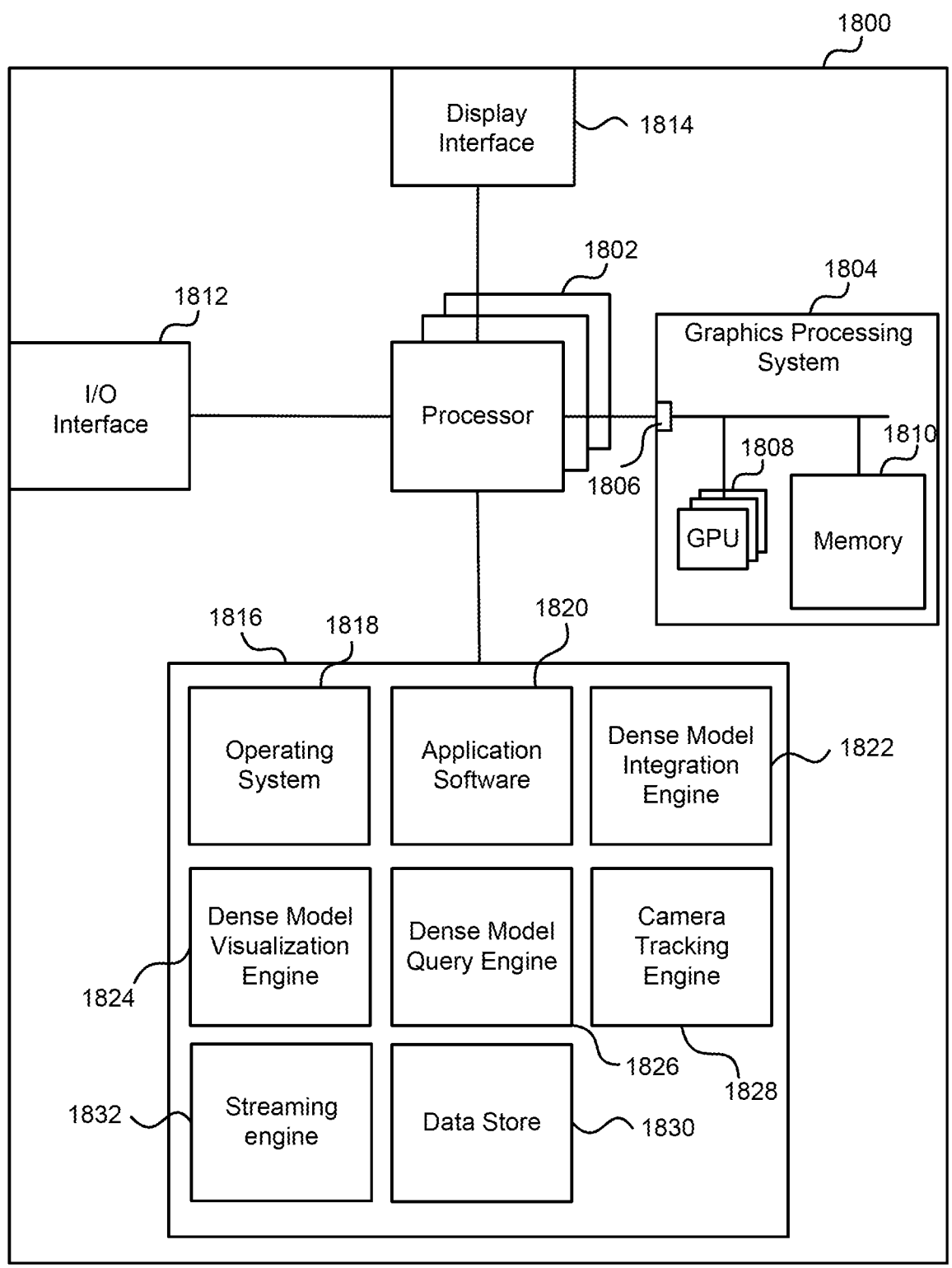
FIG. 18 illustrates an exemplary computing-based device in which embodiments of a 3D environment reconstruction system may be implemented.

FIG. 18 illustrates various components of an exemplary computing-based device 1800 which may be implemented as any form of a computing and/or electronic device, and in which embodiments of the above described 3D modeling techniques may be implemented.

Computing-based device 1800 comprises one or more processors 1802 which may be microprocessors, controllers or any other suitable type of processors for processing computer executable instructions to control the operation of the device in order to perform 3D reconstruction. In some examples, for example where a system on a chip architecture is used, the processors 1802 may include one or more fixed function blocks (also referred to as accelerators) which implement a part of the method of the 3D modeling, rendering, or streaming methods in hardware (rather than software or firmware).

The computing-based device 1800 also comprises a graphics processing system 1804 which communicates with the processors 1802 via a communication interface 1806, and comprises one or more graphics processing units 1808, which are arranged to execute parallel, threaded operations in a fast and efficient manner. The graphics processing system 1804 also comprises a memory device 1810, which is arranged to enable fast parallel access from the graphics processing units 1808. In examples, the memory device 1810 can store the 3D model, and the graphics processing units 1808 can perform the model generation and raycasting operations described above.

The computing-based device 1800 also comprises an input/output interface 1812 arranged to receive input from one or more devices, such as the mobile environment capture device (comprising the depth camera), and optionally one or more user input devices (e.g., a game controller, mouse, and/or keyboard). The input/output interface 1812 may also operate as a communication interface, which can be arranged to communication with one or more communications networks (e.g. the Internet).

A display interface 1814 is also provided and arranged to provide output to a display system integral with or in communication with the computing-based device. The display system may provide a graphical user interface or other user interface of any suitable type although this is not essential.

The computer executable instructions may be provided using any computer-readable media that is accessible by computing based device 1800. Computer-readable media may include, for example, computer storage media such as memory 1816 and communications media. Computer storage media, such as memory 1816, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1816) is shown within the computing-based device 1800 it will be appreciated that the storage may be distributed or located remotely and accessed via a network or other communication link (e.g. using communication interface 1812).

Platform software comprising an operating system 1818 or any other suitable platform software may be provided at the computing-based device to enable application software 1820 to be executed on the device. The memory 1816 can store executable instructions to implement the functionality of a dense model integration engine 1822 (e.g. arranged to build up the model in the 3D model using the process described with reference to FIG. 7), a dense model visualization engine 1824 (e.g. arranged to output a rendered image of the model using the raycasting process of FIG. 9), and a dense model query engine 1826 (arranged to get data from the model, e.g. for constructing a polygon mesh). The memory can also provide a data store 1830, which can be used to provide storage for data used by the processors 1802 when performing the 3D modeling techniques, such as for storing a polygon mesh. The data store 1830 may also store data streamed out from the 3D model. The data store 1830 may store parameter values, user settings, depth maps, rendered images and other data. The memory 1816 may store executable instructions to implement the functionality of a camera tracking engine 1828 for tracking pose of a mobile environment capture device. The memory 1816 may store executable instructions to implement the functionality of a streaming engine 1832 in examples where data is streamed into or out of the 3D model, for example, as described with reference to FIGS. 11-13.

Any of the input/output controller 1812 and the display interface 1814 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
receiving, at a processor, a stream of depth maps of a real-world environment captured by a mobile environment capture device, and also receiving at the processor a position and an orientation of the mobile environment capture device associated with each depth map;
calculating, from the depth maps, a three-dimensional (3D) model comprising values representing surfaces in the real-world environment;
storing in memory of a parallel processing unit the 3D model;
calculating an active region of the real-world environment using a current position and orientation of the mobile environment capture device;
mapping the active region to a working set of the memory;
streaming values of the 3D model between the memory of the parallel processing unit and memory of a host device on the basis of the mapping, wherein streaming values comprises:
streaming out, from the parallel processing unit to the host device, working set indices which have become absent from the active region; and
streaming in, from the host device to the parallel processing unit, working set indices which are present in the active region and absent from a previous active region.

2. The method as claimed in claim 1, wherein the 3D model is a 3D volume.

3. The method as claimed in claim 1, wherein the 3D model is stored in a hierarchical structure.

4. The method as claimed in claim 3, wherein storing the 3D model in the hierarchical structure comprises: forming interior level nodes and leaf nodes on the basis of a refinement strategy which checks whether a depth observation from a depth map is near to at least some of the values representing surfaces in the real-world environment.

5. The method as claimed in claim 4, wherein the refinement strategy checks whether a depth observation from a depth map is near to at least some of the values by using a truncation region which adapts according to the depth observation from the mobile environment capture device.

6. The method as claimed in claim 3, wherein storing the 3D model in the hierarchical structure comprises forming, in parallel, interior nodes for selected voxels of a voxel grid of the root node, by using a thread block for the selected voxels.

7. The method as claimed in claim 3, wherein storing the 3D model in the hierarchical structure comprises forming, in parallel, a child node for selected voxels of voxel grids of interior nodes, by using one thread per selected voxel of an interior node.

8. The method as claimed in claim 3, wherein the 3D model includes metadata, and wherein the metadata comprises a near surface flag indicating whether at least one depth observation associated with a node is near to at least some of the values representing surfaces in the real-world environment.

9. The method as claimed in claim 8, further comprising: computing and storing the metadata by traversing the hierarchical data structure from the leaf nodes in parallel to the root level node.

10. The method as claimed in claim 8, further comprising: checking, in parallel, voxels of a leaf node voxel grid, by comparing a value stored at a leaf node voxel with a threshold, and setting a near surface flag of a parent node of the leaf node according to the results of the checks.

11. The method as claimed in claim 8, further comprising: pruning the hierarchical structure by removing nodes on the basis of the metadata.

12. The method as claimed in claim 8, further comprising: rendering an image from the hierarchical structure using a raycasting process with space skipping, the space skipping being facilitated using the metadata.

13. A system comprising: computer-implemented method comprising:
  a first processor operable to:
    receive a stream of depth maps of a real-world environment captured by a mobile environment capture device; and
    receive a position and an orientation of the mobile environment capture device associated with each depth map;
    calculate, from the depth maps, a three-dimensional (3D) model comprising values representing surfaces in the real-world environment;
  a parallel processing unit, in communication with the first processor, the parallel processing unit operable to:
    store, in memory in communication with the parallel processing unit, the 3D model;
    calculate an active region of the real-world environment using a current position and an orientation of the mobile environment capture device;
    map the active region to a working set of the memory; and
    stream values, of the 3D model, between the memory of the parallel processing unit and a second memory of a host device on the basis of the mapping, wherein streaming values comprises:
      streaming out, from the parallel processing unit to the host device, working set indices which have become absent from the active region; and
      streaming in, from the host device to the parallel processing unit, working set indices which are present in the active region and absent from a previous active region.

14. The system as claimed in claim 13, wherein the 3D model is a 3D volume.

15. The system as claimed in claim 13, wherein the 3D model is stored in a hierarchical structure, and wherein storing the 3D model in the hierarchical structure comprises: forming interior level nodes and leaf nodes on the basis of a refinement strategy which checks whether a depth observation from a depth map is near to at least some of the values representing surfaces in the real-world environment.

16. The system as claimed in claim 15, wherein the refinement strategy checks whether a depth observation from a depth map is near to at least some of the values by using a truncation region which adapts according to the depth observation from the mobile environment capture device.

17. The system as claimed in claim 15, wherein storing the 3D model in the hierarchical structure comprises forming, in parallel, interior nodes for selected voxels of a voxel grid of the root node, by using a thread block for the selected voxels.

18. The system as claimed in claim 15, wherein storing the 3D model in the hierarchical structure comprises forming, in parallel, a child node for selected voxels of voxel grids of interior nodes, by using one thread per selected voxel of an interior node.

19. The system as claimed in claim 15, wherein the 3D model includes metadata, and wherein the metadata comprises a near surface flag indicating whether at least one depth observation associated with a node is near to at least some of the values representing surfaces in the real-world environment.

20. The system as claimed in claim 19, further comprising: computing and storing the metadata by traversing the hierarchical data structure from the leaf nodes in parallel to the root level node.

* * * * *